(12) United States Patent
Li et al.

(10) Patent No.: US 11,867,320 B2
(45) Date of Patent: Jan. 9, 2024

(54) POLYMERIC MICROFLUIDIC VALVE

(71) Applicant: National Research Council of Canada, Ottawa (CA)

(72) Inventors: Kebin Li, Longueuil (CA); Keith Morton, St-Bruno-de-Montarville (CA); Teodor Veres, Montreal (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 16/970,520

(22) PCT Filed: Mar. 4, 2019

(86) PCT No.: PCT/IB2019/051731
§ 371 (c)(1),
(2) Date: Aug. 17, 2020

(87) PCT Pub. No.: WO2019/167031
PCT Pub. Date: Sep. 6, 2019

(65) Prior Publication Data
US 2020/0408332 A1    Dec. 31, 2020

Related U.S. Application Data

(60) Provisional application No. 62/637,673, filed on Mar. 2, 2018.

(51) Int. Cl.
*F16K 99/00* (2006.01)
*B01L 3/00* (2006.01)

(52) U.S. Cl.
CPC ...... *F16K 99/0025* (2013.01); *F16K 99/0015* (2013.01); *B01L 3/502738* (2013.01);
(Continued)

(58) Field of Classification Search
CPC ............ F16K 99/0025; F16K 99/0015; F16K 99/0059; F16K 2099/0074;
(Continued)

(56) References Cited

U.S. PATENT DOCUMENTS 5,962,081 A    10/1999 Ohman et al.
5,971,355 A    10/1999 Biegelsen et al.
(Continued)

FOREIGN PATENT DOCUMENTS

EP    1065378 A2    1/2001
EP    2138233 A1    12/2009
(Continued)

OTHER PUBLICATIONS

A. Wasay and D. Sameoto, Gecko gaskets for self-sealing and high-strength reversible bonding of microfluidics, Royal Society of Chemistry, Lab on a Chip, Technical Innovation, 2015, 15, 2749-2753 (D1-XP55432410A).

*Primary Examiner* — Minh Q Le
(74) *Attorney, Agent, or Firm* — Jason E. J. Davis

(57) ABSTRACT

In a polymeric microfluidic valve, an adhesion control surface with discrete micro- or nano-scale structured surfaces are separated by fluid filled voids at an interface between an elastomeric membrane seals against a substrate layer. The structured surfaces reduce adhesion between the membrane layer and the substrate layer and prevent permanent bonding, while at the same time providing a good balance of adhesion at the valve seat to provide a sealing engagement. Microstructured adhesion control surfaces on and around valve bodies permit opening the valve, by reducing contact surface area.

20 Claims, 11 Drawing Sheets

(52) U.S. Cl.
CPC ..... *B01L 2200/12* (2013.01); *B01L 2300/123* (2013.01); *B01L 2400/0487* (2013.01); *B01L 2400/0655* (2013.01); *F16K 99/0059* (2013.01); *F16K 2099/0074* (2013.01); *F16K 2099/0084* (2013.01)

(58) Field of Classification Search
CPC ..... F16K 2099/0084; B01L 2400/0487; B01L 2400/0655; B01L 2200/12; B01L 2300/123; B01L 3/502738
USPC ................. 137/852, 843, 859; 251/331, 359
See application file for complete search history.

(56) References Cited

U.S. PATENT DOCUMENTS

| | | | |
|---|---|---|---|
| 6,126,140 A * | 10/2000 | Johnson | F15C 5/00 251/129.01 |
| 6,158,712 A * | 12/2000 | Craig | B01L 3/502707 251/331 |
| 6,742,661 B1 | 6/2004 | Schulte et al. | |
| 6,761,420 B2 | 7/2004 | Maluf et al. | |
| 7,345,002 B2 | 3/2008 | Schaper | |
| 7,501,245 B2 | 3/2009 | Quake et al. | |
| 7,833,486 B2 * | 11/2010 | Fielden | F16K 99/0017 422/502 |
| 8,158,728 B2 | 4/2012 | Desimone et al. | |
| 8,388,908 B2 | 3/2013 | Blaga et al. | |
| 8,512,538 B2 | 8/2013 | Majlof et al. | |
| 8,584,703 B2 | 11/2013 | Kobrin et al. | |
| 8,747,776 B2 | 6/2014 | Yoon et al. | |
| 8,778,282 B2 | 7/2014 | Jung et al. | |
| 9,267,618 B2 | 2/2016 | Park et al. | |
| 9,291,284 B2 | 3/2016 | Penterman et al. | |
| 9,291,567 B2 | 3/2016 | Malic et al. | |
| 9,435,490 B2 | 9/2016 | Galas et al. | |
| 9,498,914 B2 | 11/2016 | Brassard et al. | |
| 9,630,177 B2 | 4/2017 | Stern et al. | |
| 9,644,623 B2 * | 5/2017 | Mathies | C12Q 1/689 |
| 2002/0022261 A1 * | 2/2002 | Anderson | B01L 3/5027 435/287.2 |
| 2003/0030023 A1 * | 2/2003 | Wang | F15C 5/00 251/331 |
| 2004/0011977 A1 | 1/2004 | Hower et al. | |
| 2005/0249917 A1 * | 11/2005 | Trentacosta | G05D 23/192 428/137 |
| 2006/0078470 A1 * | 4/2006 | Zhou | F16K 99/0057 422/503 |
| 2007/0166199 A1 * | 7/2007 | Zhou | F04B 43/14 422/400 |
| 2007/0200081 A1 * | 8/2007 | Elizarov | F16K 99/0001 251/331 |
| 2007/0275455 A1 | 11/2007 | Hung et al. | |
| 2008/0138248 A1 * | 6/2008 | Viovy | B29C 66/0242 422/400 |
| 2008/0178987 A1 * | 7/2008 | Zhou | B29C 66/1122 156/73.1 |
| 2009/0165876 A1 * | 7/2009 | Atkin | F16K 99/0057 137/825 |
| 2010/0101670 A1 | 4/2010 | Juncker et al. | |
| 2011/0135546 A1 * | 6/2011 | Kurowski | B29C 66/53461 422/502 |
| 2011/0150702 A1 * | 6/2011 | Kim | F16K 99/0015 156/60 |
| 2011/0162785 A1 * | 7/2011 | Zhou | F16K 99/0057 156/196 |
| 2011/0240127 A1 * | 10/2011 | Eberhart | F16K 99/0059 137/1 |
| 2011/0305607 A1 | 12/2011 | Jung et al. | |
| 2012/0181460 A1 | 7/2012 | Eberhart et al. | |
| 2012/0245042 A1 * | 9/2012 | Liu | C12M 23/16 506/7 |
| 2013/0139899 A1 * | 6/2013 | Galas | F16K 99/0026 137/12 |
| 2013/0156658 A1 | 6/2013 | Shim et al. | |
| 2013/0337234 A1 * | 12/2013 | Shim | B32B 38/0008 428/447 |
| 2014/0004507 A1 * | 1/2014 | Malic | G01N 21/554 435/6.1 |
| 2014/0326400 A1 * | 11/2014 | Araci | F16K 99/0059 156/242 |
| 2014/0328999 A1 | 11/2014 | Aizenberg et al. | |
| 2016/0051935 A1 * | 2/2016 | Li | B01D 69/10 210/797 |
| 2016/0195085 A1 * | 7/2016 | Van Eemeren | F04B 43/028 417/472 |
| 2017/0097108 A1 * | 4/2017 | Huff | F16K 99/0048 |
| 2017/0291747 A1 * | 10/2017 | Janta | B81C 1/00158 |
| 2018/0187669 A1 * | 7/2018 | Liao | F04B 43/095 |
| 2018/0296982 A1 * | 10/2018 | Li | B01D 67/0034 |
| 2019/0134627 A1 * | 5/2019 | Burger | B01L 3/502715 |
| 2020/0122139 A1 * | 4/2020 | Smith | B81C 1/00087 |
| 2020/0175524 A1 * | 6/2020 | Pfeiffer | G06K 7/01 |
| 2021/0086181 A1 * | 3/2021 | Xu | B01L 3/502707 |

FOREIGN PATENT DOCUMENTS

| | | |
|---|---|---|
| WO | 9508716 A2 | 3/1995 |
| WO | 1995008716 A2 | 3/1995 |
| WO | 2004028955 A2 | 4/2004 |
| WO | 2007044690 A2 | 4/2007 |
| WO | 2012126646 A1 | 9/2012 |

* cited by examiner

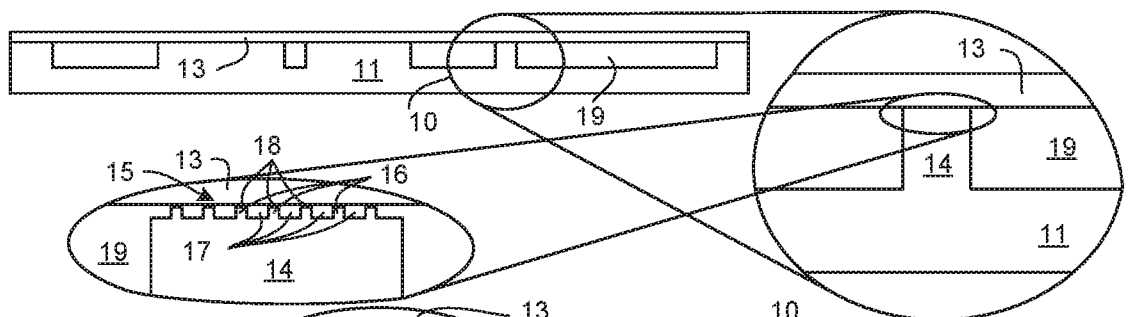
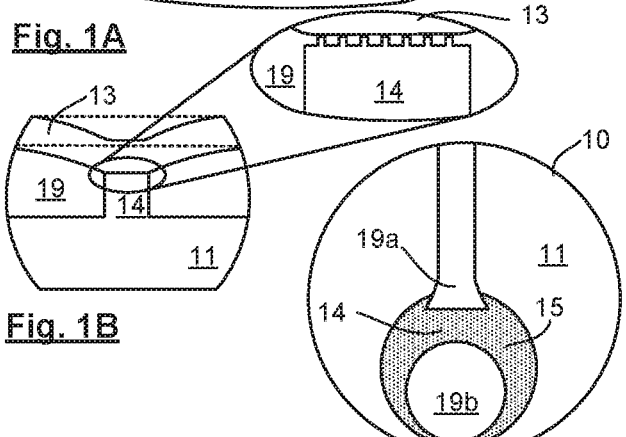
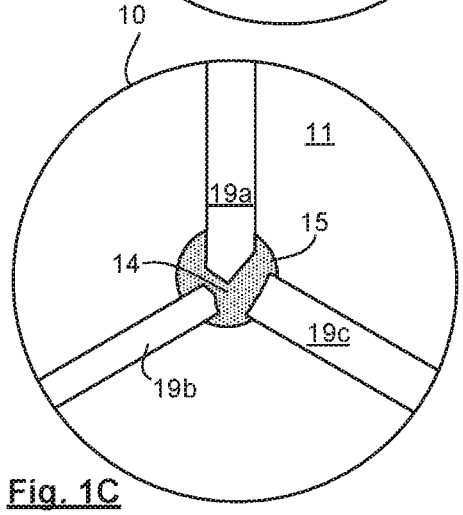
Fig. 1A
Fig. 1B
Fig. 1C
Fig. 1D
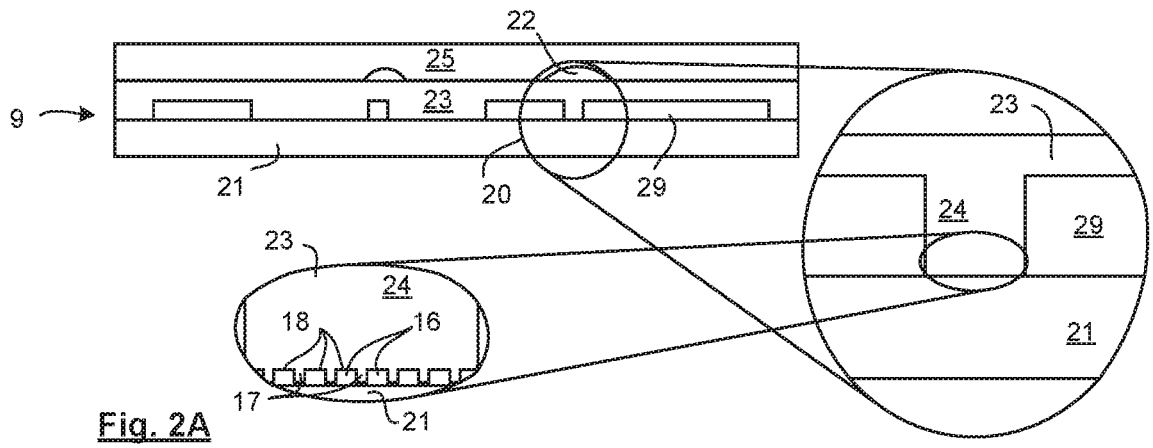
Fig. 2A
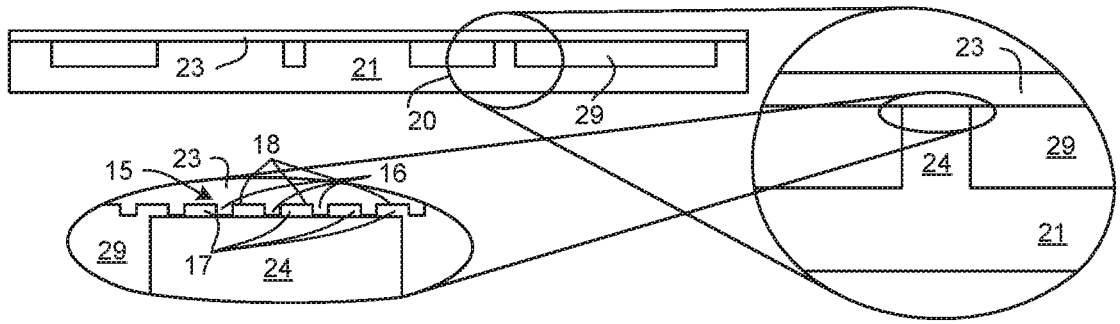
Fig. 2B Fig. 7A                                   Fig. 7B

POLYMERIC MICROFLUIDIC VALVE

CROSS-REFERENCE TO RELATED APPLICATIONS

This application is a national phase entry of International Patent Application PCT/IB2019/051731 filed 4 Mar. 2019 which claims the benefit of U.S. Provisional Patent Application Ser. No. 62/637,673 filed 2 Mar. 2018.

FIELD

This application relates to microfluidic devices, in particular to valve structures for microfluidic devices with improved adhesion control.

BACKGROUND

Microvalves have been widely used within the micro total analysis system (μTAS) community to control fluid flows. Membrane-based pneumatic microvalves are very attractive because of a simple sandwich structure comprising a flow layer, a membrane layer and a pneumatic control layer. The sandwich structure, while very elegant and functional, leads to certain difficulties. The membrane layer must seal against to the flow layer everywhere except at the valve seat to provide leak-free operation of the microfluidic channels.

There are three strategies to avoid bonding at the valve seat for polydimethylsiloxane (PDMS)-based normally closed valves. Since bonding of PDMS with PDMS or PDMS with glass is typically assisted by oxygen plasma treatment, bonding can be reduced using the following techniques: Strategy 1, is to mask the valve seat area during the $O_2$ plasma treatment; Strategy 2, is to use micro contact printing methods to selectively deposit oligomers on the oxidized PDMS valve seat, to block PDMS to PDMS or PDMS to glass bonding. Strategy 3 uses non-PDMS valve seats (pre-patterned with metal layer) or other sacrificial barrier on the membrane layer applied during the bonding process.

The mechanism of bonding one flexible polymer (e.g. thermoplastic elastomer (TPE), saturated and unsaturated thermoset rubbers, and especially sterile or medical grade elastomers, including PDMS) to another, or to a harder thermal plastic (e.g. cyclic olefin copolymer (COC)) is different from that of PDMS. Here the bonding is akin to physical bonding through the Van der Waals force assisted by thermal treatment. Such bonding requires conformal contact between two bonding parts so surface roughness plays an important role in the bonding process. Such bonding also requires a clean surface. Still, strategies to prevent permanent bonding in PDMS cases could also be applied to TPE-based valves (except Strategy 1: masking to protect the valve seat during the $O_2$ plasma treatment).

In a TPE-based valve, the valve seat can be made hydrophobic to reduce the surface energy by using a similar method to Strategies 2,3, by depositing Teflon™, for example, through a mask. Using a mask can be troublesome, especially when the valve is small and/or there are many valves in the microfluidic device. The space between where the membrane must adhere (to provide the seal), and where it must not (valve seat) is small, and the adhesion is critical to functioning of the valve.

According to Strategy 2, the deposition location of the oligomer or other barrier layer on the valve seat is precisely controlled by using micro-contact printing, which is accomplished by first precisely depositing the oligomer or other barrier layer on a stamp followed by contacting the stamp with a micro-structured fluidic layer (e.g. either COC or TPE). Therefore, alignment during the micro-contact process is very important, otherwise poor bonding of the membrane against the microfluidic channel will result, which will cause leakage of fluid around the valve seat.

For Strategy 3, a patterning method must be utilized to deposit a metal layer or other sacrificial layer on the valve seat. The patterning method includes a lift-off process or other stencil mask method. The lift-off process involves photo-lithography, which is usually not practical when the substrate is a micro-structured thermal plastic or TPE. As for the stencil mask method, alignment is again a challenge.

Once assembled, the normally closed valve must be able to cycle between closed and open configurations in a reasonable time, with a limited force. The membrane layer must have sufficient adhesion to a flow layer through the valve seat in order to seal the microfluidic channel when closed, but have sufficient release capability to deform and release from the flow layer under pressure from a pneumatic control layer. The adhesion of the membrane to the flow layer through the valve seat must be tuned to provide both characteristics to the valve.

There remains a need in the art for a microfluidic valve in which the membrane does not permanently bond to the flow layer during assembly, and in which the membrane layer is able to cyclically adhere to and release from the flow layer to close and open the valve with sufficient ease and speed over a long period of usage.

SUMMARY

Applicant has found that controlling patterns of discrete micro-scale surfaces in a polymeric microfluidic valve seat, with fluid filled pockets between the surfaces, it is possible to tune the adhesion of a membrane layer to the seat that allows for better sealing and release, without requiring additional material layers to device manufacture. Controlled patterning can sufficiently reduce adhesion between the membrane layer and the substrate layer at the valve seat to prevent permanent bonding of the membrane layer to the substrate layer, while at the same time providing a sufficient balance of adhesion between the membrane layer and the substrate layer to provide a sealing engagement at the valve seat when the valve is closed. The valve can be opened by reducing fluid pressure in a pneumatic control layer, thereby disengaging the membrane layer from the substrate layer. Furthermore, the substrate and membrane layers, of the same compositions, can produce permanent bonding away from the valve seat. When the membrane layer comprises a resilient deformable polymer, many open/close cycles over a long period of time are possible without valve failure or significant degradation in valve performance.

In one aspect, there is provided a polymeric normally closed microfluidic valve comprising: a plastic substrate; a resilient deformable elastomeric membrane facing the substrate, the substrate and membrane defining a valve region in a microfluidic channel of a microfluidic device; a valve seat situated in the valve region between the membrane and the substrate, the valve seat defining a protrusion that separates segments of the microfluidic channel and having an adhesion-controlled surface at which the membrane contacts and seals against the substrate when the valve is closed, the adhesion-controlled surface comprising a three-dimensional pattern of microstructures that provide a plurality of separated top meeting surfaces and recessed surfaces, the top meeting surfaces collectively having a cumulative surface area less than an area spanned by the adhesion-controlled surface thereby ensuring fluid-filled voids between the microstructures when the valve is normally closed, the adhesion-controlled surface on the valve seat designed to meet a meeting surface of one of the membrane and the substrate in the valve region, the meeting surface having no local relief structures, the plurality of microstructures reducing adhesion between the membrane and the substrate in the spanned area compared to adhesion if no microstructures were present in the spanned area and compared to adhesion if the membrane and the substrate were in conformal contact over all available surfaces including the top meeting surfaces and the recessed surfaces on the adhesion-controlled surface; and, a control fluid chamber sealingly separated from the microfluidic channel by the membrane, the valve being normally closed with the membrane sealed against the substrate when there is no pressure differential between the control fluid chamber and the microfluidic channel, the control fluid chamber depressurizable to provide sufficient force on the membrane to deform the membrane and overcome adhesion between the substrate and the membrane at the adhesion-controlled surface of the valve seat to separate the membrane from the substrate thereby opening the valve.

In another aspect, there is provided a method of controlling fluid flow in a microfluidic channel using a normally closed microfluidic valve, the method comprising: providing a normally closed microfluidic valve as defined above in a microfluidic channel in a microfluidic device; and, depressurizing the control fluid chamber to a negative pressure to provide sufficient force on the membrane to deform the membrane and overcome adhesion between the substrate and the membrane at the adhesion-controlled surface of the valve seat to separate the membrane from the substrate thereby opening the valve to permit fluid to flow through the microchannel.

In another aspect, there is provided a method of surface treating a valve seat of a polymeric normally closed microfluidic valve, the method comprising: fabricating a valve seat on a resilient deformable elastomeric membrane or on a plastic substrate for the polymeric normally closed valve, the valve seat having an adhesion-controlled surface at which the membrane is to contact and seal against the plastic substrate when the valve is closed, the adhesion-controlled surface comprising a plurality of microstructures that provide a plurality of distinct top meeting surfaces and recessed surfaces including at least one top meeting surface and one recessed surface, the top meeting surfaces having a net surface area less than a surface area spanned by the adhesion-controlled surface thereby providing voids between the microstructures, the plurality of microstructures reducing surface energy in the area spanned by the adhesion-controlled surface compared to surface energy in regions of the membrane or substrate in which no microstructures are present; and, contacting the membrane or substrate with a surface-treating material, the surface-treating material preferentially wetting the area spanned by the adhesion-controlled surface of the valve seat instead of the regions of the membrane or substrate in which no microstructures are present thereby surface treating the valve seat without surface treating the regions of the membrane or substrate in which no microstructures are present.

Advantageously, the polymeric normally closed microfluidic valve comprises a robust and repeatable, low-stiction valve seat that is patterned with features that can be used to tune valve adhesion. Further, the valve possesses systematic and repeatable operation through a considerable number of open/close cycles. Furthermore, no valve seat alignment is required for post treatment or post assembly, leading to dramatically simpler device fabrication. Yet further, hydrophilicity of the valve seat can be tuned using morphology, dimensions and position of the microstructures, instead of requiring the use of sacrificial layers in post deposition techniques, although the use of sacrificial layers in post deposition techniques are not excluded from use.

The polymeric normally closed valves may be used in microfluidic devices, for example microfluidic cover lids for cell analysis devices, inertial focusing devices for soil parasite harvesting, and Lab-on-a-CD applications (e.g. reagent storage, sample preparation, nucleic acid amplification, analyte detection, etc.)

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIGS. 1A,B,C,D shows a first embodiment of a microfluidic valve in accordance with the present invention, and three variants thereof, the first embodiment showing a normally closed valve with substrate patterning; the first variant showing a normally open valve; the second variant showing a 3-way valve with staged openings; and the third variant showing a valved via.

FIGS. 2A,B depict a second embodiment of a normally closed microfluidic valve of the present invention and a variant thereof: the second embodiment having membrane patterning to define microfluidic passages and the valve; and the variant having patterning of both the membrane and the substrate.

FIG. 7A is a schematic diagram of a method of depositing sacrificial layers on microstructured valve seats of a chip using micro contact printing.

FIG. 7B is a schematic diagram of a method of depositing sacrificial layers on prior art valve seats using micro contact printing, for comparison with FIG. 7A.

DETAILED DESCRIPTION

Figure 3:
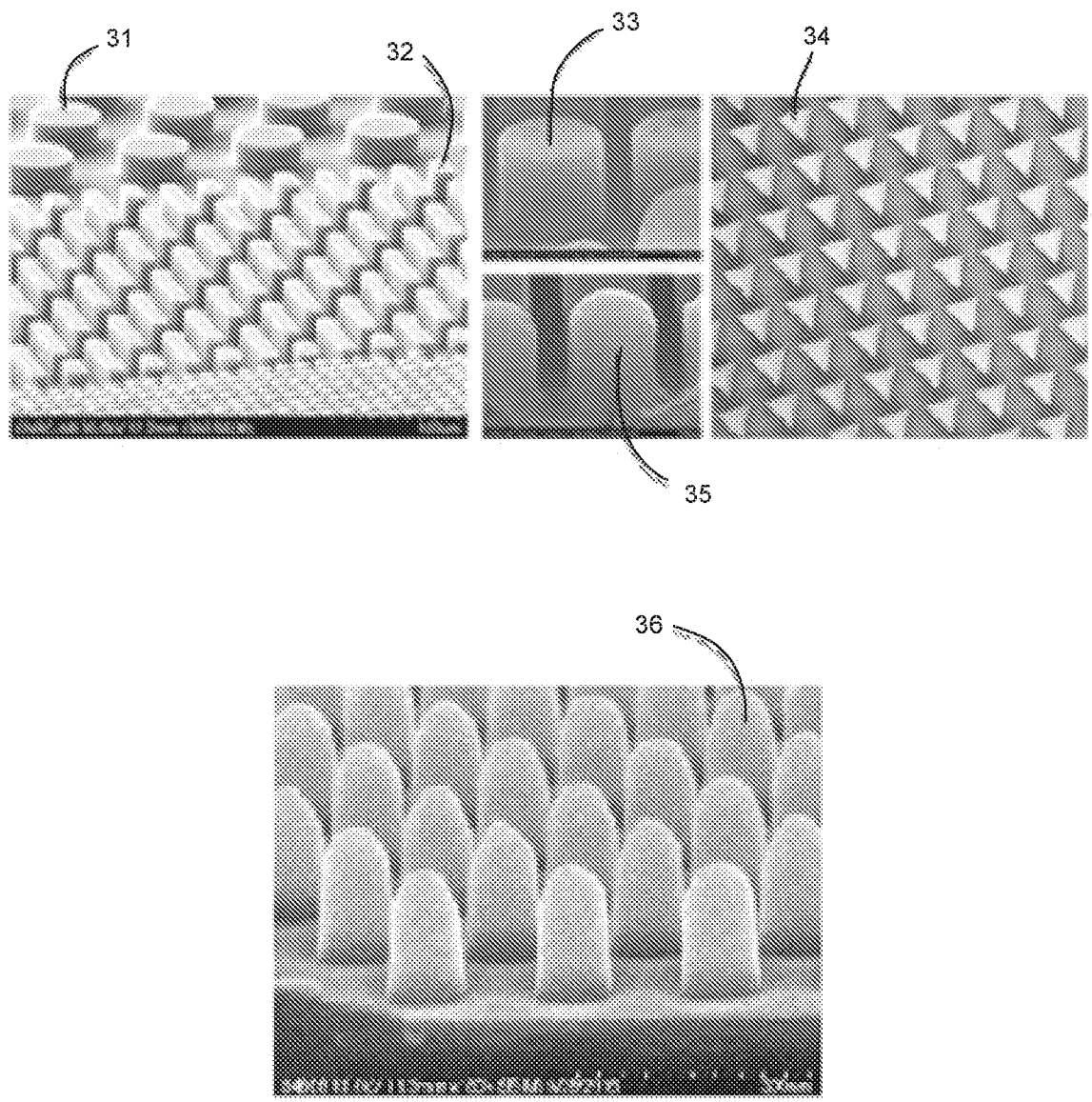
FIG. 3 depicts optical and scanning electron microscope (SEM) images of various embodiments of microstructured features that may be formed on an adhesion-controlled surface of a valve seat of the microfluidic valves of FIG. 1 and FIG. 2.

A microfluidic device comprises a network of microfluidic channels and reservoirs with one or more valve regions therein defined between a membrane layer and a substrate layer. The microfluidic network is sealed by meeting and adhesion of the two layers away from the valve regions, microfluidic channels and reservoirs. A third pneumatic (or other fluid) control layer may also be provided for actuation of the valve, comprises one or more control fluid chambers for the one or more valve regions to control operation of one or more valves in the valve regions.

The membrane layer comprises a resilient deformable elastomeric membrane, which may comprise any suitably flexible polymeric material having sufficient elasticity to undergo deformations due to pressure changes and still return to an original shape when pressure is sufficiently equilibrated above and below the membrane. The elastomeric membrane may comprises a thermoplastic elastomer (TPE) or polydimethylsiloxane (PDMS), but is most preferably a TPE as these polymers can be selected for better, and more reliable adhesion to a variety of substrates, without surface treatment. The TPE may be, for example, a styrene ethylene butylene styrene block copolymer (SEBS), a styrene-butadiene (SBS), a styrene iso-butylene styrene (SIBS), an ethylene-vinyl acetate copolymer, a styrene-isoprene-butadiene block copolymer, an ionomeric TPE, a single phase melt processable TPE, a transparent medical TPE (e.g. Mediprene™), oil-free TPE (e.g. Mediprene™ OF 400M, OF 600M, OF 800M), Mediprene® 500M or the like or any blend thereof with or without various fillers and enhancers for mechanical, optical, thermal, or chemical modification or effect. The membrane has a thickness and a Young's modulus that permit resilient deformation. As the thickness of the membrane increases, the stiffness increases to maintain suitable resilient flexibility. The thickness is preferably in a range of about 20-1000 µm, for example 75-750 µm or 100-500 µm. The Young's modulus is preferably in a range of about 0.1-100 MPa. For example, for a series of Mediprene™ OF from 400M to 900M, the stress of the materials at 100% strain may be from 0.8 MPa to 5.8 MPa, as measured by ASTM D638.

The substrate layer comprises a plastic substrate, which may be composed of any polymer material suitable for constructing microfluidic devices. The plastic substrate may be composed of a polymer material that is the same or different as the resilient deformable elastomeric membrane. Some examples of polymer material suitable for the plastic substrate are thermoplastic elastomers (TPE), polydimethylsiloxane (PDMS), hard thermal plastics (TP) and the like, but TPs and TPEs harder than the membrane are preferred to limit deformations within the valve other than that of the membrane. Hard thermal plastics include, for example, cyclic olefin copolymers (COC, e.g. Zeonor™), polystyrene (PS), polypropylene (PP), poly(methylmethacrylate) (PMMA) and the like. Blends of polymer materials may be utilized, as well as the full variety of suitable formulations of each polymer. The substrate layer may be a hybrid of plastic materials where a portion of the substrate comprises one plastic material and one or more other portions comprise a different plastic or other material. Preferably, the substrate is different from the membrane and has a stiffness at least one order of magnitude larger than a stiffness of the membrane. Hard thermal plastics typically have a Young's modulus at least one order of magnitude larger than that of TPEs.

Thus, the valve seat includes a protrusion in the valve region that separates the microfluidic channel segments to block flow between the channel segments (or channels interconnected by opening of the valve) when the adhesion-controlled surface of the valve seat is adhered to the membrane or substrate. The protrusion is formed into the substrate or the membrane for sealing against the membrane or substrate, respectively (i.e. if the protrusion is in the membrane, the valve seat seals against the substrate and if the protrusion is in the substrate, the valve seat seals against the membrane vice versa). The microfluidic channel in which the valve seat is situated may be formed by patterning the substrate or the membrane, or both, although alignment is greatly facilitated by only patterning one of the substrate and membrane. At least two microfluidic channels or channel segments terminate in the valve region where the valve seat is situated. The valve seat comprises an adhesion-controlled surface at which the membrane contacts and seals against the substrate when the valve is closed. The valve seat with the adhesion-controlled surface may be integrally formed with the membrane, along with the microfluidic channels, or integrally formed with the substrate along with the microfluidic channels, as is consistent with surface patterning and film forming methods known in the art. The adhesion-controlled surface preferably surrounds openings to the channel segments, that may be enlarged, at least in a width dimension, with respect to the channel. The adhesion-controlled surface of the valve seat meets the membrane or substrate where the membrane or substrate is flat and smooth such that no pains are needed to ensure alignment of the valve seat with respect to relief structures of the membrane or substrate.

Herein an area spanned by a structure, such as the adhesion-controlled surface or the valve seat, is understood to be a 2D measure of the area of a shape defined by a perimeter of the structure, as opposed to a surface area of the structure which itself may have much higher surface area.

The valve seat comprises an adhesion-controlled surface having a plurality of micro- or nano-structures thereon. The plurality of micro- or nano-structures may be include a hierarchy of structures of different scales (e.g. microstructures defining micro-scale faces, on which smaller microstructures or nanostructures are defined. Nanostructures on microstructures can be used for tuning the hydrophilicity of the valve seat locally and for reducing contact surface area between the membrane and the substrate at the valve seat. For the former (tuning hydrophilicity), the nanostructures enhance the hydrophilicity of the valve seat locally so that the surface of the valve seat can be locally functionalized by wicking effects. For this application, the size and number as well as the distribution of the nanostructures are less constrained. For the latter (contact surface reduction), the nanostructures should be big enough and arranged in a way to ensure that the membrane does not collapse resulting in conformal contact between the membrane and the substrate during device assembly. If the membrane deforms to the point that there is no air or other fluid-filled space between the structures, the structures will not serve to decrease bonding at the valve seat, but would actually increase bond strength.

The microstructures and/or nanostructures may be regularly or irregularly shaped and arranged. Preferably, the microstructures and/or nanostructures are pillars. Preferably, the microstructures and/or nanostructures are regularly shaped up to patterning defects. For example, the microstructures and/or nanostructures may have circular cross-sections, elliptical cross-sections, polygonal cross-sections (e.g. triangular, square, rectangular pentagonal, hexagonal and the like). The microstructures and/or nanostructures may be, for example filled or hollow, cylinders, rectangular prisms, triangular prisms, or cones, or frusta, thereof, or such structures with rounded edges or corners. In a preferred embodiment, microstructures and/or nanostructures taper from the top meeting surfaces to bases of the microstructures and/or nanostructures. The taper preferably has a taper angle with respect to normal from about 0.5° to about 45°, for example about 5° to about 26°. Taper angle may be determined from aspect ratio of microstructure or nanostructure. In a preferred embodiment, microstructures and/or nanostructures are generally conical or frustoconical. Preferably, conical or frustoconical microstructures and/or nanostructures have cone angles (i.e. opening angle) from about 20° to about 130°, for example about 60° to about 120°.

The microstructures and/or nanostructures may have flat or rounded tops, or the tops may have some other morphology. Rounded tops are preferred to permit fine tuning of stiction between the membrane and the substrate at the valve seat.

The structures preferably have a height of 75 nm or more, more preferably 100 nm or more. The height is preferably in a range of about 100 nm to 100 µm, for example preferably about 100-600 nm for nanostructures and preferably about 1-50 µm for microstructures. The structures preferably have a widest dimension (other than height) in a range of about 1-200 µm, for example about 5-100 µm. The structures preferably have an aspect ratio (height to diameter, or height to minor axis, or height to smaller of length and width) in a range of about 1:2 to 6:1.

When hierarchical structures are present, there are fewer constraints on the height and diameter of the smallest scale structures, provided the structures as a whole reduce the surface energy of the structures. The smallest scale structures may not appreciably reduce contact surface area, but may be useful for controlling hydrophilicity, which may be particularly useful when additional surface treatment (for example through the surface coating by capillary wetting or self-aligning and localized micro-contact printing technique) is used.

The three-dimensional pattern of microstructures preferably comprises an open pattern. In an open pattern, the fluid-filled voids are inter-connected across the valve seat. Opposed sides of the valve seat, i.e. those adjacent the microfluidic channels/segments, may therefore comprise microstructures having edge gaps therebetween so that there is fluid connection between the microfluidic valve segments and the fluid-filled voids in the valve seat at the edge gaps. Nevertheless, when the valve is normally closed, there is sufficient hydrodynamic resistance (at least for aqueous samples) in the valve seat to prevent fluid from flowing through the valve seat between the channel segments, the valve seat still acting as an effective block to fluid flow.

The structures (at any level in a hierarchy) may be irregularly positioned on the valve seat or may be formed in regular arrays. Regular arrays are preferred because they provide more consistent adhesion across the area spanned by the adhesion-controlled surface. The valve seat may be densely or sparsely decorated with structures (and the structures may be densely or sparsely decorated with finer structures). Density may be expressed in terms of a cumulative surface area of the top meeting surfaces as compared to an area spanned by the adhesion-controlled surface, as discussed below.

The structures provide a plurality of top meeting surfaces and recessed surfaces. Preferably, the plurality of distinct top meeting surfaces and recessed surfaces comprises at least 25 distinct top meeting surfaces. More preferably the number of top meeting surfaces is in a range of from 50 to 3000, which depends on the size of a valve and the size and shape of the microstructures (or nanostructures). For example, for a valve with size of 0.8 mm in diameter, the number of top meeting surfaces is in the range of from 50 to 1256 if the microstructures are 10 µm in diameter and 5 µm high. The top meeting surfaces form the contact surface between the membrane and the substrate when the valve is normally closed.

In between the microstructures (and nanostructures when present) are fluid-filled voids, even when the valve is closed (fluid includes air). The voids are bounded by the recessed surfaces. Recessed surfaces include an outwardly facing recessed surface of the valve seat and side walls of the microstructures (and nanostructures when present). The fluid-filled voids have a collective void volume and the microstructures (and nanostructures when present) have a collective structure volume. The collective void volume is preferably between 50% and 99.4%, for example between 53.2% and 99.5% of a sum of the collective void volume and the collective structure volume when the valve is normally closed with no pressure differential between the control fluid chamber and the microfluidic channel. The collective void volume is based on a valve with a diameter of 0.8 mm, a valve gap of 100 µm, a fluidic channel width of 100 µm and a number of micropillars (10 µm in diameter and 5 µm in height) of from 50 to 3000.

The top meeting surfaces have a cumulative surface area less than a surface area spanned by the adhesion-controlled surface. The cumulative surface area of the top meeting surfaces on the adhesion-controlled surface is preferably between 0.55% and 76% of the spanned area of the valve seat. Further, the cumulative surface area of the top meeting surfaces is less than a total surface area of the adhesion-controlled surface, the total surface area including the cumulative surface area of the top meeting surfaces and a net surface area of the recessed surfaces, assuming all intermediate walls are vertical, which may not be the case. As noted above, recessed surfaces comprise both outwardly facing surface of the valve seat and side walls of the microstructures (and nanostructures when present). The cumulative surface area is preferably between 0.54% and 30%, for example between 1% and 17.6% of the total surface area of the adhesion-controlled surface when the valve is in normally closed configuration. In one example the cumulative surface area is based on a valve with a diameter of 0.8 mm in diameter, a valve gap of 100 µm, a fluidic channel 100 µm wide and number of micropillars (10 µm in diameter and 5 µm in height) of from 50 to 1256.

In microfluidic devices of the present invention, the polymeric materials of which the membrane and the substrate are composed, may have high surface adhesion properties. When conformally mated over a mating area, adhesion between the membrane and the substrate may lead to permanent bonding of the layers during fabrication, which is excellent for forming sealed microfluidic channels, but results in a tendency for normally closed valves to fail to open, or to be very slow to open after assembly, or after closure under pressure for a long period of time. Further, adhesion between the membrane and the substrate often leads to slow, non-robust dynamic opening and closing. The plurality of micro-/nano-structures reduce adhesion between the membrane and the substrate in the area spanned by the adhesion-controlled surface because of the fluid-filled voids. Thus, compared to adhesion if no structures were present in the spanned area, the overall contact surface area is reduced. The structures have a mean spacing that serve to support the membrane, to avoid collapse of the fluid-filled voids. By reducing contact surface area, and retaining fluid-filled voids, structuration reduces adhesion compared to adhesion if the membrane and the substrate were in conformal contact over all the spanned surface.

In a normally closed configuration and when the valve is first assembled, the voids between the structures contain a fluid (e.g. a gaseous or liquid medium) thereby trapping the contained fluid in the valve seat. When the valve is normally closed, no fluid can pass across the valve seat in the microfluidic channel unless there is a pressure applied on the fluidic channel that overcomes the threshold pressure of the normally closed valve. During assembly, the fluid trapped in the voids helps reduce adhesion between the membrane and the substrate thereby reducing adhesion between the layers and mitigating permanent bonding between the membrane and the substrate. Further, the fluid voids trapped between the valve seat and the membrane or substrate serve as nuclei for strain cracks, which assist with opening the valve. The strain cracks propagate through the entire area of a valve seat under negative pressure applied to open the valve, thereby assisting in the separation of the valve seat from the membrane or the substrate.

Reduction in adhesion between the membrane and the substrate provided by the structures thus leads to surer initialization of the valve after fabrication, and surer re-initialization of the valve after a long period of non-use. The reduction in adhesion also leads to faster, more robust dynamic cycling of the valve when in use. In normally closed microfluidic valves, where microstructures are present in the spanned area, initial opening time after valve assembly may be as low as 10 minutes or less, or 5 minutes or less, or 3 minutes or less, or 1 minute or less, or 45 seconds or less, or 30 seconds or less, or 20 seconds or less, or 15 seconds or less, or 10 seconds or less, or even 2 seconds or less, which is faster than valves without microstructures and/or nanostructures (without any other surface treatment) in the spanned area by at least 2 times, at least 5 times, at least 10 times, or even at least 15 times. Further, in normally closed microfluidic valves where microstructures are present in the spanned area, dynamic cycling can be performed reliably for at least 250 cycles, at least 500 cycles, at least 700 cycles, or even at least 1000 cycles. Opening times, whether initial, re-initial or dynamic, are affected by the magnitude of the negative pressure used to effect opening of the valve. The negative pressure is typically in a range of about −68 kPa to −34 kPa. The opening times provided above are as measured when the negative pressure is about −34 kPa.

The pneumatic control layer comprises the control fluid chamber, which contains a pressurizable and depressurizable gas or liquid, preferably a gas, more preferably (sterile) air. The control fluid chamber is preferably a pneumatic air chamber. The control fluid chamber may be controlled by a pressure manifold with three options: pressurized, depressurized and vented, corresponding to 'pressed closed', 'pressed open' and 'normal' configurations for the valve. Thus, a 'normally closed valve' is a valve with a configuration in which the resilient deformable elastomeric membrane is sealed against the plastic substrate through the top meeting surfaces of the adhesion-controlled surface of the valve seat when there is no pressure differential between the control fluid chamber and the microfluidic channel, and a 'normally open valve' is open under no pressure differential. In practical microfluidic devices, rarely is a single universal pneumatic control applied to all valves of a chip, typically each valve is under separate pneumatic control.

Microfluidic devices containing the polymeric normally closed valves may be fabricated by a variety of scalable production techniques including, for example, injection molding, hot-embossing, micro contact printing, laser machining or computer numerical controlled machining.

The adhesion-controlled surface may be surface treated locally to further reduce adhesion between the membrane and the substrate. Modifying surface energy of the surfaces of the valve seat permits fine tuning the adhesion to a desired level for a particular application. The treatment applied may be formed of any material that suitably modifies surface hydrophilicity of the top meeting surfaces, as well as the recessed surfaces. Some examples of materials suitable for the sacrificial layer are oligomers, non-stick coatings (e.g. Teflon™, silane). The treatment may be applied by physical contact imprinting, vapor deposition, physical or chemical vapor deposition, plasma treatment, plasma enhanced chemical vapor deposition or any other suitable technique. Depositing a layer locally on the valve seat may be suitably accomplished by using a self-aligning and localized micro contact printing technique, which can significantly simplify fabrication.

EXAMPLES

Structures of Normally Closed Valves

Referring to FIG. 1A, a microfluidic chip 9 is shown with a first embodiment of a normally closed microfluidic valve 10. The valve 10 comprises a patterned plastic substrate 11, and a resilient deformable elastomeric membrane 13 covering substrate 11 to seal and enclose a network of microfluidic channels and chambers. FIG. 1 is a thin-section view running a length of microfluidic channel 19 which passes through the valve 10. The patterning of the substrate 11 defines microfluidic channel 19 and various other connected channels and chambers. A valve body 14 is formed as part of the plastic substrate 11 and protrudes from the substrate 11 to form terminations of two segments of the microfluidic channel 19 at opposite sides of the valve body 14. The valve body 14 comprises an adhesion-controlled surface 15 comprising a plurality of micropillars 16 (only three labeled) separated by a plurality of voids 17 (only four labeled). Each of the plurality of voids 17 is defined by recesses formed in a membrane-facing surface of the valve seat 14 and side surfaces of the micropillars 16. Tops of the micropillars 16 for top meeting surfaces 18 (only three labeled) are prone to water-tight adhesion with the membrane 13 when the valve 10 is closed as illustrated in FIG. 1A.

While FIG. 1A shows the normally closed valve 10 in the closed state, it will be appreciated that it can be opened by applying a retraction force on membrane 13 in the vicinity of the valve. As the adhesion-controlled surface 15 offers limited resistance, by virtue of its limited surface area of contact (meeting surfaces 18 and dually by the presence of voids 17), once this adhesion is overborn by the retraction force, the membrane 13 lifts from the valve body 14, and the valve is open.

Referring to FIG. 1B, a variant of the first embodiment is shown. Herein features of variants of an embodiment are identified by like reference numerals, and their descriptions are not repeated herein. FIG. 1B is of a normally open microfluidic valve 20, when closed. As such, membrane 13 is deflected by a positive pressure applied to press the membrane 13 against valve body 14. To make this variant a normally open valve 10, valve body 14 is only about ⅔ a height of the channel 19. To accommodate the difference in height, a smooth transition is provided in the channel height surrounding the valve body 14. While this variant is shown with a valve body 14 extending ⅔ a channel height, it will be appreciated that any other extent, from below a floor of the channel 19, to a channel height or beyond, could bear the adhesion-controlled surface 15. In FIG. 1B, the membrane's 13 relaxed position is shown in dotted lines.

While the embodiment of FIG. 1A,B do not admit a view of it, it is preferable for the adhesion-controlled surface 15 to extend beyond the valve body 14, and onto a top surface of the substrate 11 surrounding the channel 19. This way more of the membrane is able to lift off, and channel geometry limitations are not imposed on the valve 10.

FIG. 1C illustrates a top plan view of a second variant of the embodiment of FIG. 1A. Specifically, a top patterned surface of substrate 11 is shown with the membrane 13 removed. While FIGS. 1A,B showed thin sections along channel 19, it will be appreciated that the composed channel segments of a valve do not need to extent at any particular angle, and can be other than 180°. In FIG. 1C, three channels 19a,b,c are shown in a wye formation radiating from valve 10. This is produced by surface patterning of substrate 11. Three microfluidic channels formed in the substrate, each terminate at respective walls of valve body 14, which is of full height of the channels 19a,b,c. As shown, channels 19a,b,c need not all have a same channel geometry (l,w,h), but it is generally preferable to match hydrodynamic resistances or choose variations in hydrodynamic resistances of segments of a microfluidic path, purposefully.

The valve body 14 is an indistinguishable part of substrate 11 away from recesses 19a,b,c, and is shown having a distinct asymmetry. A thickness of the valve body 14 that separates channels 19a,b is much less than what separates channels 19a,c and 19b,c. As such, it is possible to arrange for preferential bridging of two channels as opposed to two other channels of a valve.

If, as in FIG. 1B, the valve body 14 is not full channel height an extent of the gradual change in channel height may match a conical, or hemispherical dimple having an extent lying at or near the limit of the adhesion-controlled surface 15.

The adhesion-controlled surface 15, that was clearly shown on a top surface of the valve body 14 in the side elevation views of FIGS. 1A,B is shown to be present on the top meeting surface of substrate 11 all around the valve body 14. This permits more of the membrane to be released, and allows more control over how the membrane deforms, regardless of the design of the channels 19. While two channel segments or three channels are shown in these drawings, other numbers of channels can be used.

FIG. 1D is a variant of the present invention in which channel 19b is a through-bore or via that passes through substrate 11, and accordingly valve body 14 extends between the through-bore 19b and channel end 19a. As in the previous variant, the adhesion-controlled surface 15 extends beyond the valve body 14, and (though not necessary) surrounds the whole through-bore 19b.

Referring to FIG. 2A, a second embodiment of a normally closed microfluidic valve 20 in a chip 9 comprises a plastic substrate 21, a pneumatic air chamber 22 and a resilient deformable elastomeric membrane layer 23 between the plastic substrate 21 and the pneumatic air chamber 22. The membrane layer 23, as a patterned layer (e.g. of TPE) defines a microfluidic channel 29, which is backed by a thinned section of the membrane layer 23 that serves as a valve membrane.

Unlike the previous embodiments, FIG. 2A shows a typical control layer for microfluidics, which defines a fluid supply chamber 22. Typically these layers are formed of relatively stiff materials so that pressure changes in a fluid supply chamber 22 effectively deform the valve membrane disproportionately to other walls of the fluid supply chamber 22. Like the microfluidic network provided by the membrane layer 23, the control layer has a network of ports, chambers, and interconnecting channels.

A valve body 24 is formed as part of the membrane layer 23, and unlike the channel 29, has a surface that aligns with a meeting (with substrate) surface of the membrane layer 23. The valve body 24 comprises an adhesion-controlled surface 15 as described hereinabove. Much as structured top surfaces of the substrate, intermediate the channels, in FIG. 1 are patterned to provide the adhesion controlled surface 15, the adhesion controlled surface in FIG. 2A preferably extends over a surface of the valve body 24. As will be shown in FIG. 2B, the patterning need not be limited to the valve body, but rather can extend over parts of a top surface of the membrane layer 23 in between the channel segments 29, for example.

FIG. 2B illustrates a further embodiment in which the adhesion control surface is patterned on an otherwise unstructured membrane 23, but the microfluidic patterning is provided in the substrate. This may be preferable if patterning very high density features in the substrate is particularly challenging, as TPE films may be more easily patterned. One disadvantage of this embodiment is the need for alignment of the patterned segments of the membrane 23 with the valve body 24. Some mitigation of problems in alignment can be provided by providing the adhesion control surfaces 15 over very wide areas relative to the dimensions of the valve body 24, and even of the fluid chamber 22. As long as the adhesion control surfaces 15 of distinct valves do not overlap, and no adhesion control surface 15 extends into a port, channel, chamber or other opening on the chip, there is no risk of leaking across these porous regions of the membrane 23. No matter how large the adhesion control surface 15 is, the dimensions of the fluid chamber 22 dictate where the pressure will be applied in the membrane 23.

Regardless of whether the substrate, membrane, or both are patterned, the micropillars 16 are preferably formed with sufficiently regular shapes and arrangements to provide uniform sealing adhesion across the valve. Some examples of regular shapes and tiling arrangements are depicted in FIG. 3. For example, the micropillars 31, 33, 35, 36 have circular cross-sections; the micropillars 32 have rectangular cross-sections; the micropillars 34 have triangular cross-sections. The micropillars may have other cross-sectional shapes, for example pentagonal, hexagonal, oval and the like. The micropillars may be, for example, cylindrical (31, 33, 35), rectangular prisms 32, triangular prisms 34, conical 36, frustoconical or the like. Tops of the micropillars may be flat (31, 32, 33, 34) or rounded (35, 36).

Figure 4:
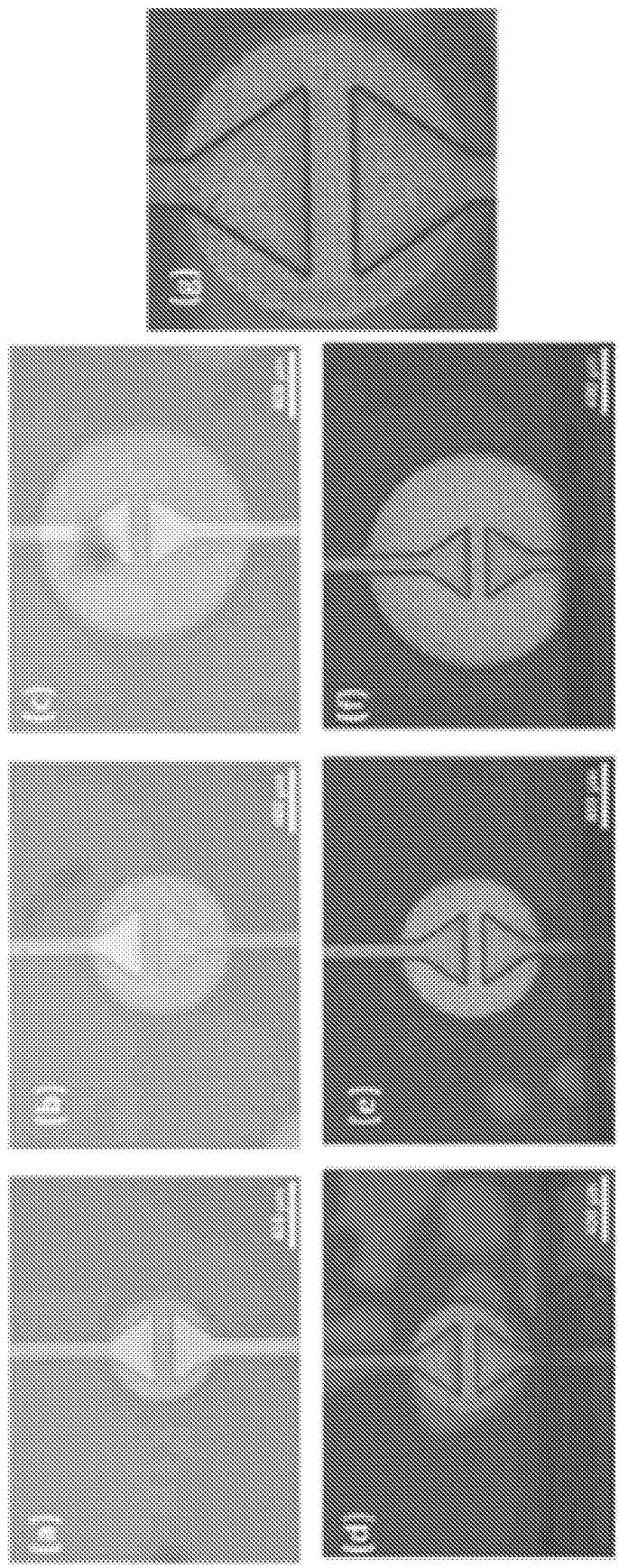
FIG. 4 depicts optical microscope images of normally closed valves without microstructured features on the valve seat (a, b, c) and with microstructured features on the valve seat (d, e, f), the valves having pneumatic air chamber diameters of of 0.6 mm, 0.8 mm and 1.2 mm, respectively. Image (g) is a magnified view of image (d).

FIG. 4 depicts optical microscope images of normally closed valves formed using a hot embossing technique, the images taken immediately after valve assembly. In each valve, a membrane layer comprises a thermoplastic elastomer (TPE) membrane having a thickness of 180 μm, and a flow layer and a pneumatic control layer are formed from cyclic olefin copolymer (COC). A valve seat is formed in the COC flow layer between two microfluidic channel segments also formed in the COC flow layer. An air chamber is formed in the COC pneumatic control layer above the valve seat. The TPE membrane is disposed on the valve seat in contact with a contact surface of the valve seat between the microfluidic channel segments and the air chamber. In FIG. 4, the valves in images (a, b, c) are formed without microstructured features on the valve seat, whereas the valves in images (d, e, f) are formed with microstructured features on the valve seat. The pneumatic air chambers in images (a, d) have a diameter (D) of 0.6 mm. The pneumatic air chambers in images (b, e) have a diameter (D) of 0.8 mm. The pneumatic air chambers in images (c, f) have a diameter (D) of 1.2 mm. Image (g) is a magnified view of image (d). The valve seat has a gap of 100 μm in length. FIG. 4 clearly shows that immediately after assembly, the TPE membrane is bonded to the valve seat if there are no microstructures on the valve seat (a, b, c). In the microstructured valve seat case (d, e, f, g), the membrane is not permanently bonded to the valve seat. The presence of microstructures on the contact surface of the valve seat has reduced bonding strength between the TPE membrane and the COC valve seat. The presence of air trapped in the microstructured valve seat during fabrication has also reduced bonding strength between the TPE membrane and the COC valve seat. It is clear that normally closed valves having microstructured interfaces between the membrane layer and the flow layer mitigates the permanent bonding problem during fabrication, whereas normally closed valves that do not have such microstructured interfaces experience the permanent bonding problem during fabrication.

Fabrication of Microfluidic Devices Comprising Normally Closed Valves

Figure 5:
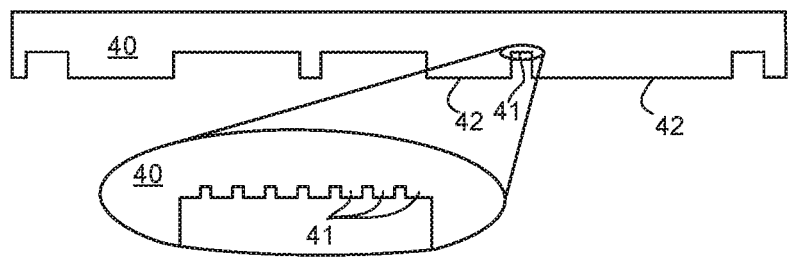
FIG. 5 is a schematic diagram of a mold for fabricating a microstructured valve seat in the valve of FIG. 1 using injection molding.

Referring to FIG. 5, one embodiment of a method of fabricating a microstructured valve seat in a microfluidic channel in a flow layer of a normally closed valve uses injection molding. The injection molding technique involves using a metallic mold 40 with micro-features 41 formed on a surface thereof at a proper location between two raised reliefs 42. After injection molding a plastic substrate material into the mold 40, a plastic part 45 is formed in the mold 40, which can be separated from the mold 40. The micro-features 41 give rise to a valve seat having microstructured features, and the two raised reliefs 42 give rise to a microfluidic channel in the plastic part 45, which forms the flow layer of the normally closed valve. The remainder of the valve may be assembled from the flow layer, a membrane layer and a pneumatic control layer by methods known in the art.

Figure 6:
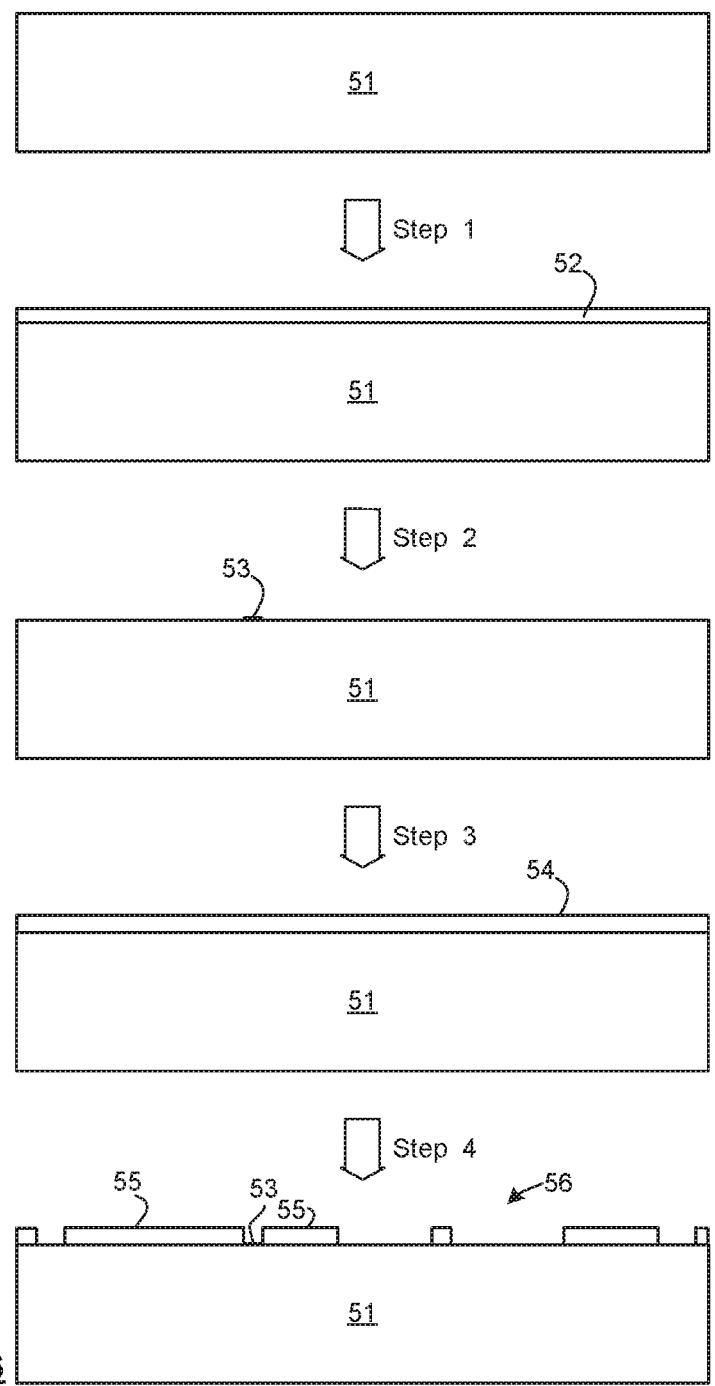
FIG. 6 is a schematic diagram of a method of fabricating a mold for hot-embossing a substrate to form a microfluidic device with a structured valve seat.

Referring to FIG. 6, another embodiment of a method of fabricating a microstructured valve seat in a microfluidic channel in a flow layer of a normally closed valve uses hot embossing. In the hot embossing technique, a silicon (or glass) wafer 51 is coated with a first SU8 photoresist layer 52 in Step 1 to form the silicon wafer with a layer of photoresist thereon. In Step 2, standard photolithography is used to form a micro-featured SU8 photoresist 53 on the silicon wafer from first SU8 photoresist layer 52. In Step 3, a second SU8 photoresist layer 54 is layered on the silicon wafer 51 over top of the micro-featured SU8 photoresist 53. In Step 4, soft photolithography is used to expose the micro-featured SU8 photoresist 53 and to form raised SU8 reliefs 55 adjacent the micro-featured SU8 photoresist 53 to form an SU8 on silicon mold 56 that may be used in a hot embossing process. The mold 56 may be transferred to an epoxy mold or a working stamp to fabricate a flow layer with a microfluidic channel and micro structures on a valve seat in the microfluidic channel. Note also that by methods known in the art the silicon or glass mold for hot embossing can be made using standard photolithography to define etching of the microfabricated valve seats and microfluidic channel features directly into the silicon or glass substrates. The flow layer may be formed from a plastic substrate material using the epoxy mold or a working stamp.

If, in some applications, microstructured valve seats alone do not sufficiently reduce adhesion between the membrane layer and the flow layer, the microstructures may be surface-treated to further reduce hydrophilicity and surface energy of the contact surface of the valve seat. It is a particular advantage of the normally closed valves disclosed herein that the membrane layer or flow layer having the microstructured valve seat thereon may be contacted with a surface-treating material, and the surface-treating material will preferentially wet the microstructured valve seat by self-aligned wicking. Contacting the membrane layer or flow layer with the surface-treating material may be accomplished using micro contact printing, or capillary wetting through a microfluidic channel in an assembled microfluidic device containing the valve.

In one embodiment, a micro contact printing process may be utilized to simply and efficiently print non-stick or other sacrificial barriers on the valve seats in order to further reduce the bonding strength. Because of a hydrophilicity difference between the microstructured surface of the valve seat and the non-microstructured surfaces in other portions of the flow layer or membrane layer, localized transfer of sacrificial materials during the micro contact printing process can be readily accomplished by self-alignment, which greatly simplifies the micro contact printing process. The hydrophilicity difference leads to wicking of the sacrificial material at the microstructures of the valve seat, which localizes the sacrificial material at the valve seat, leaving the remainder of the valve uncoated with the sacrificial material. This makes it possible to scale up fabrication of microfluidic devices incorporating normally closed valves, thereby reducing per unit device cost.

FIG. 7A illustrates a method of depositing a sacrificial layer on microstructured valve seats using micro contact printing, which can be compared to FIG. 7B illustrating a method of depositing sacrificial layers on prior art valve seats using micro contact printing. The processes in FIG. 7A and FIG. 7B are similar, however, because the valve seats in FIG. 7B do not have different hydrophilicity from the remainder of the substrate, the ink containing the sacrificial material deposited on the printing stamp must be aligned perfectly with the locations of the valve seats on the substrate. Any misalignment would cause ink to be deposited on portions of the substrate other than at the valve seats, leading to potential delamination of the device at other locations, leading to undesired leaks during operation. In contrast, the microstructured valve seats in FIG. 7A have different hydrophilicity than other portions of the substrate, therefore the printing stamp can be completely coated with the ink containing the sacrificial material because the ink will be preferentially wicked by the microstructured valve seats leaving the remainder of the substrate free of sacrificial material. Not needing to perfectly deposit ink on the printing stamp and not need to align the printing stamp perfectly with the substrate represents an enormous savings in fabrication time and cost.

Figure 7C:
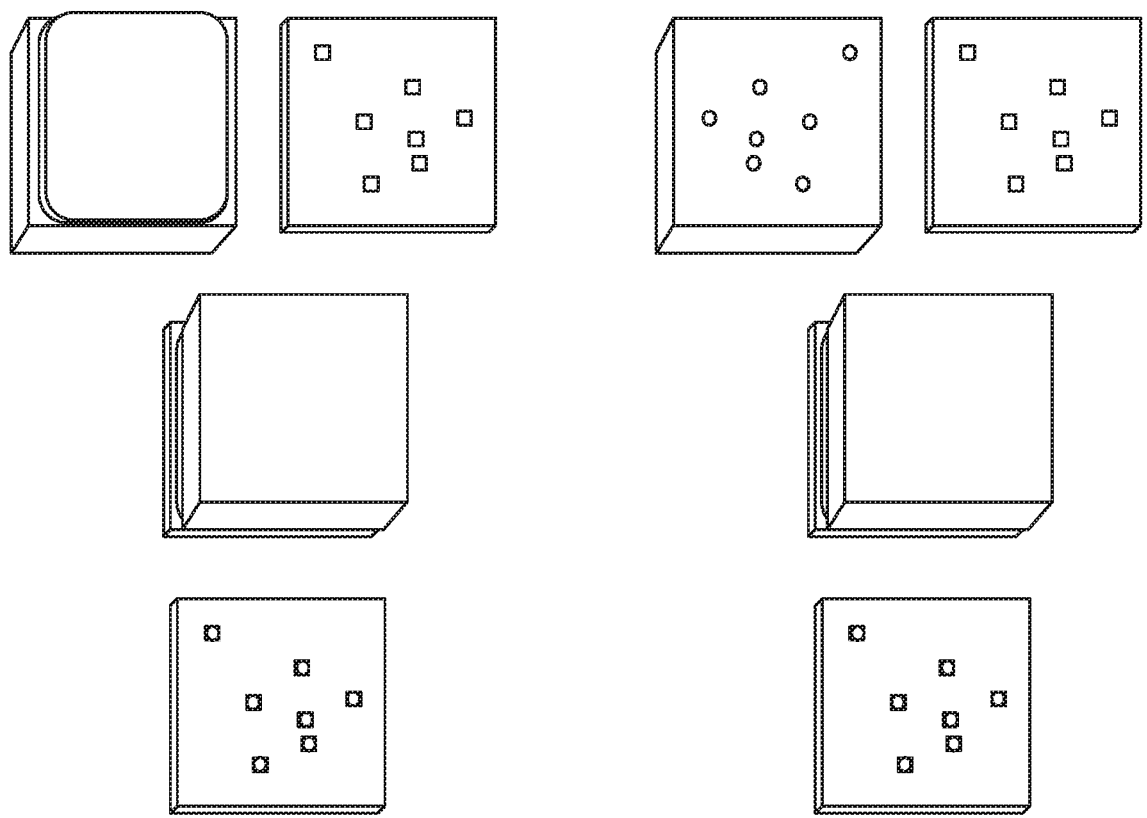
FIG. 7C depicts an optical microscope image of a valve showing surface treatment with a layer by micro contact printing accomplished locally at a microstructured adhesion controlled surface of a substrate.
Figure 7C:
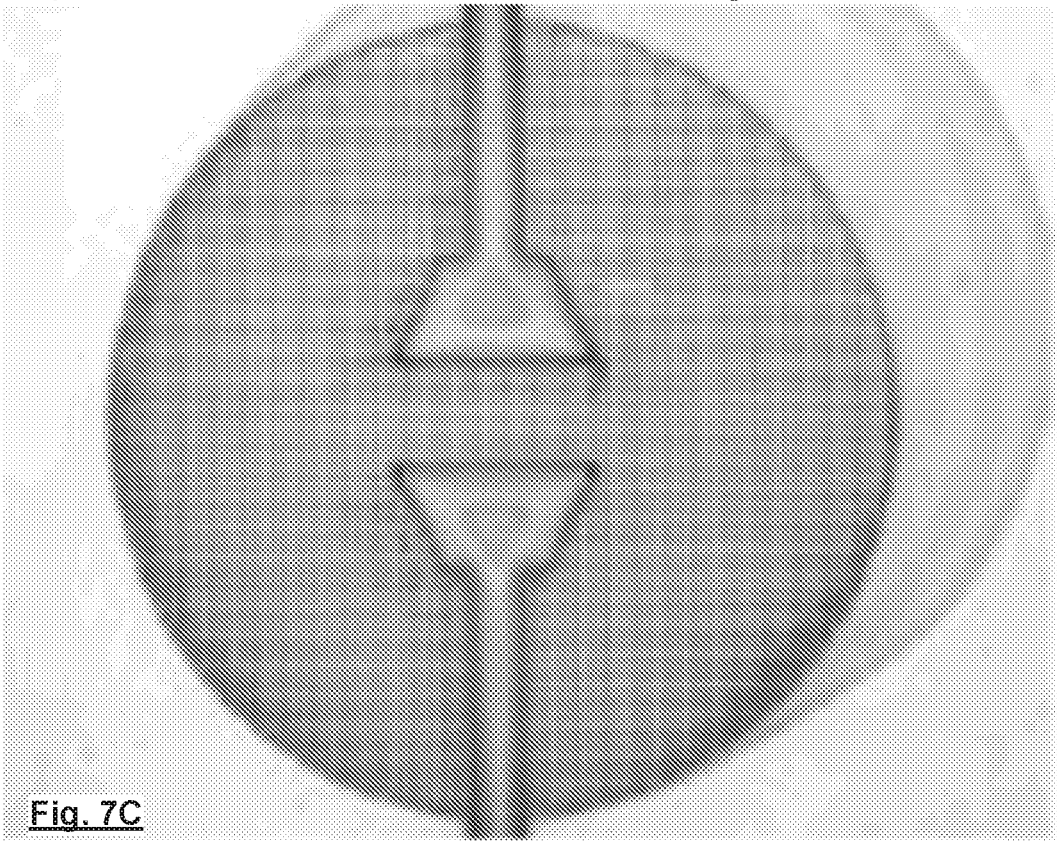

FIG. 7C depicts an optical microscope image of an actual valve showing that surface treatment with a sacrificial layer by micro contact printing can be accomplished locally at a microstructured valve seat.

Operating Normally Closed Valves

Figure 8:
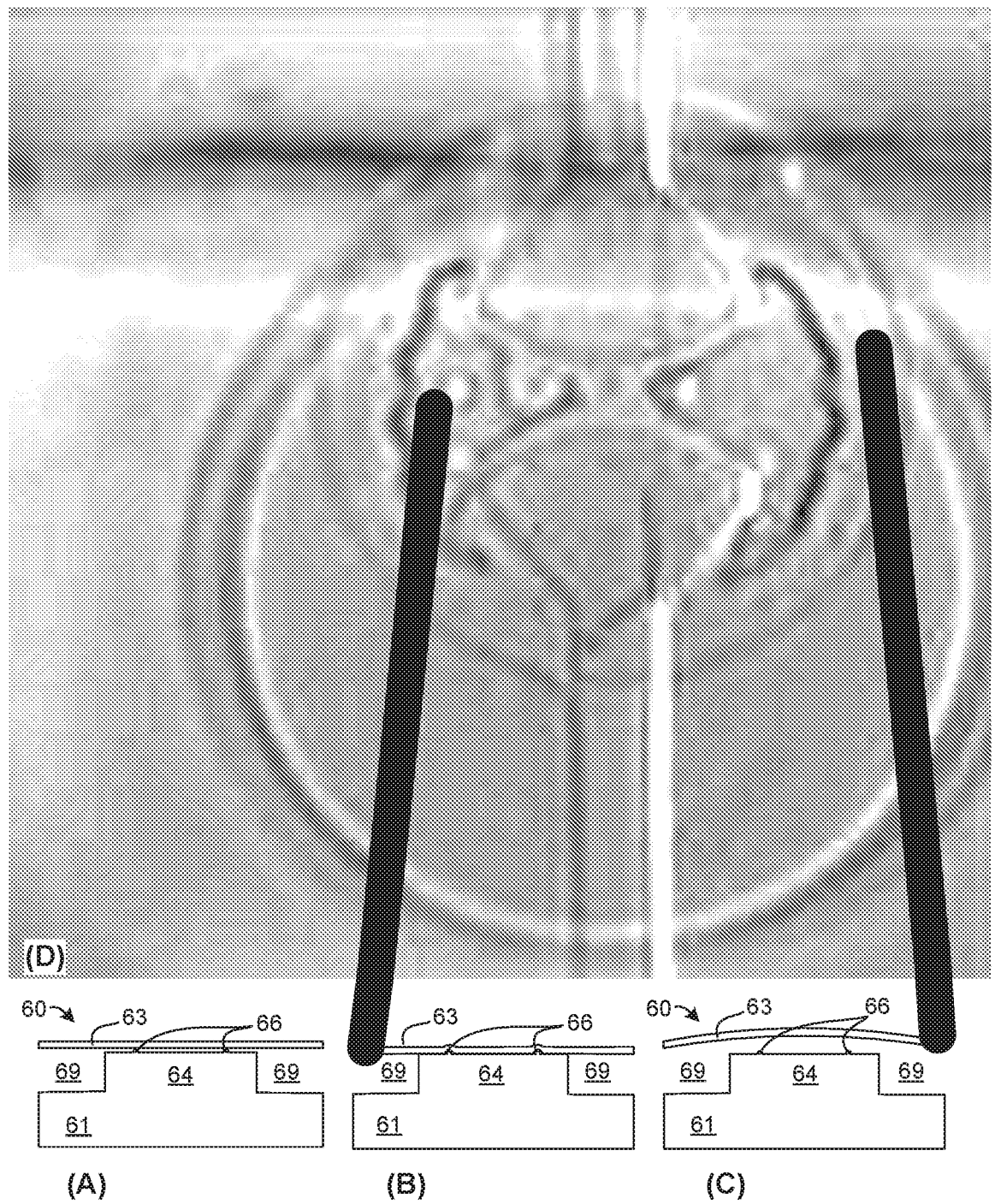
FIG. 8 depicts schematic diagrams of a normally closed microfluidic valve under different pressure conditions ((A) P=0, (B) P<0, (C) P>0), and (D) an optical microscopic image of a valve when P is switched from positive 23 psi (positive 159 kPa) to negative 10 psi (negative 69 kPa).

Normally closed microfluidic valves are normally closed when air pressure differential between the pneumatic air chamber and the microfluidic channel is 0. FIG. 8 depicts schematic diagrams of a normally closed microfluidic valve 60 under different pressure conditions ((A) P=0, (B) P<0, (C) P>0). The valve 60 comprises a plastic substrate 61 into which a microfluidic channel 69 and a microstructured valve seat 64 have been formed. The valve seat comprises an adhesion-controlled surface comprising micro posts 66 thereon (only two are shown for simplicity). A resilient deformable elastomeric membrane 63 is in sealing contact with the micro posts 66, separating the valve seat 64 and microfluidic channel 69 from a pneumatic air chamber (not shown). As seen in (A), when the pressure differential between the microfluidic channel 69 and the pneumatic air chamber is 0 (i.e. P=0), the valve 60 is normally closed with the membrane 63 is in sealing contact with the micro posts 66 while leaving air trapped between the membrane 63 and recessed surfaces of the valve seat 64. As seen in (B), when a positive pressure is applied to the air chamber (P>0), the membrane 63 can be deformed toward the valve seat 64 to further engage all (conformal contact) or some of the recessed surfaces of the valve seat 64, to more tightly close the valve 60, or to maintain closure under a higher pressure across the channel 69. As seen in (C), when a negative pressure is applied to the air chamber (P<0), the membrane 63 can be deformed away from the valve seat 64 to disengage from the valve seat 64, thereby opening the valve 60. As seen in (D), an optical microscopic image of a valve when P is switched from positive 23 psi (positive 159 kPa) to negative 10 psi (negative 69 kPa) illustrates the valve being partially closed and partially open.

Figure 9:
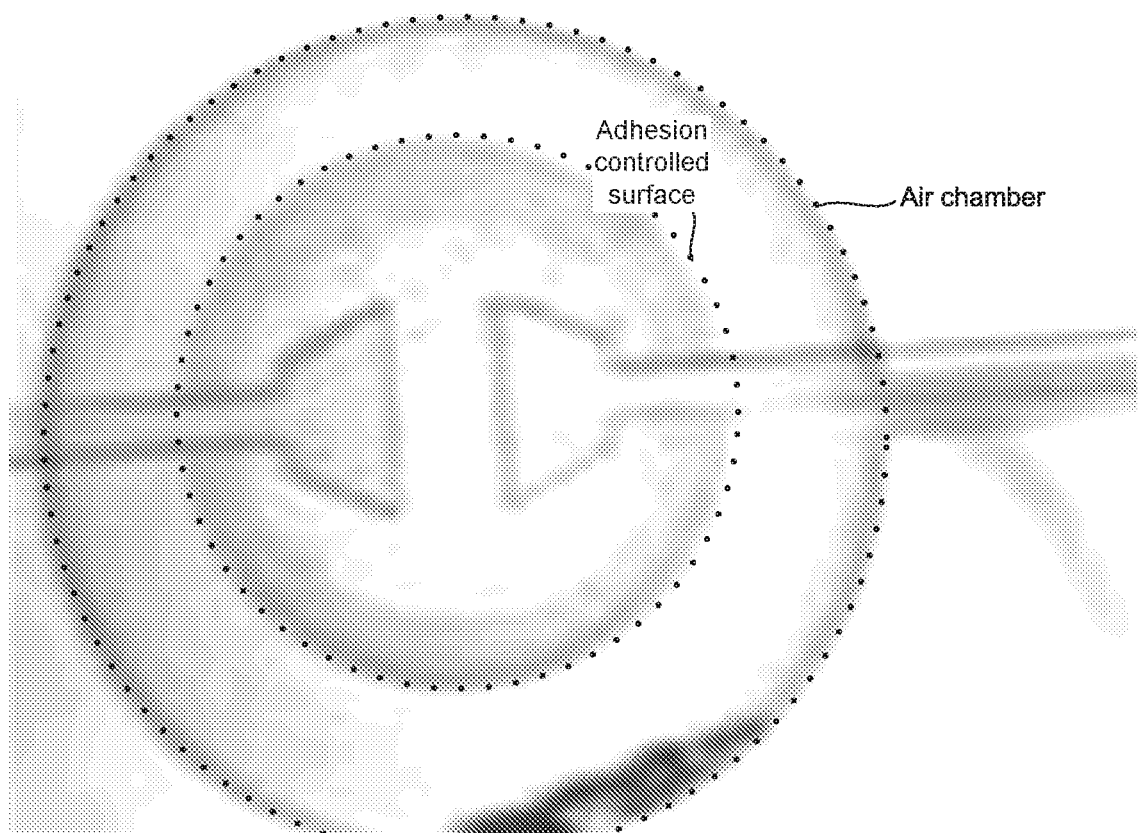
FIG. 9 depicts optical microscopic images of a normally closed valve with microfeatures on a valve seat hot-embossed on a TPE thin film (140 µm), showing dimensions of the adhesion control layer, and air chamber.

FIG. 9 shows another example of a normally closed valve with a microstructured valve seat and a microfluidic channel both hot-embossed into a TPE thin film, with the air chamber hot-embossed into Zeonor™. The valve is normally closed and the portion circled by the inner dotted line indicates the adhesion-controlled surface which includes the valve seat and surrounding area with microstructures. Ends of the microfluidic channel are contained within the inner circle. The outer dotted line circumscribes the air chamber. The valve was opened by applying −6 psi (−41 kPa) air pressure in the air chamber. The valve is shown in a pressed closed configuration, under +10 psi (+69 kPa) air pressure in the air chamber. Pressed closure did not permanently bond the valve.

Figure 10:
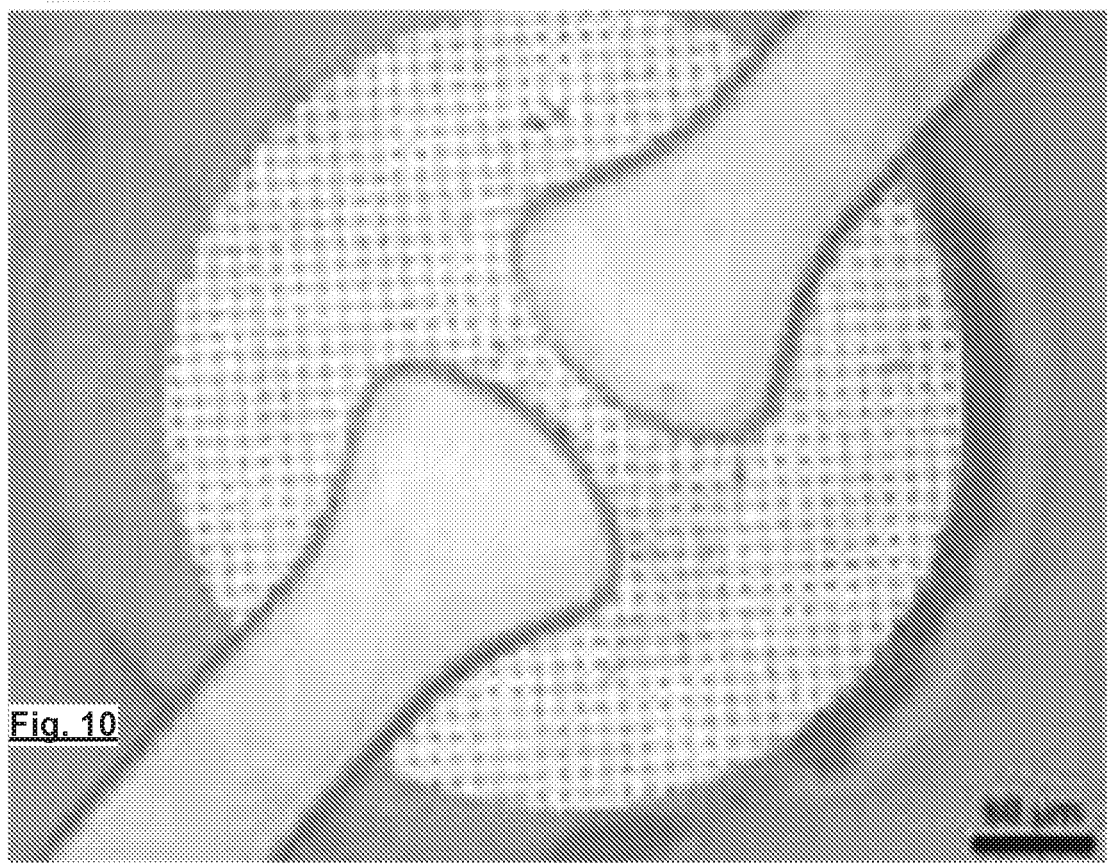
FIG. 10 is an optical micrograph of a normally closed valve with microfeatures on a valve seat hot-embossed on a TPE/Zeonor™ hybrid substrate (the microstructures are on TPE), a CNC machined Zeonor™ cover with pneumatic air channels and chambers and a TPE membrane with thickness of 200 µm in the middle.

FIG. 10 shows an example of a normally closed valve with an adhesion controlled surface. The valve is produced by a stack of hot-embossed TPE and Zeonor™ layers, with pneumatic control channels and chambers CNC machined on one Zeonor substrate, microfluidic network and the adhesion controlled surface embossed on another Zeonor substrate and a TPE membrane with thickness of 200 μm in between. The valve has a diameter of 1.5 mm. The fluidic channel has a width of 300 μm and a depth of 100 μm, while the valve seat has a gap length of 200 μm. There are about 1100 micropillars (20 μm in diameter and 10 μm in height) on top of the surface of the valve seat. Testing results show that the valve in a normally closed configuration can remain closed without leaking when the fluidic channel is pressurized up to 11.7 kPa because of sufficient adhesion between the membrane and the microstructured valve seat.

The adhesion or bonding strength at the interface between two parts can be measured by a lap joint testing method which is specified in ASTM D3165 and ASTM D3528. In these standard test setups, shear stress is generated by a pulling force at the two ends of the specimen, which usually results in failure of the testing specimen. Here, adherence of the membrane to the substrate at the valve seat is characterized by measuring the opening time that it is required to fully separate the membrane from the valve seat under negative pressure in the air chamber, with or without additional pressure applied on the fluidic channel. The testing method is advantageously done in-situ, which reflects real behavior of valves in applications. The opening time is an important parameter dynamic characteristic of the valve.

Further, there are two types of opening times: static opening time (i.e. initial valve opening time after assembly or re-initialization opening time after a period of inactivity); and, dynamic opening time (i.e. opening time during cyclic valve opening/closing operation). The opening time is longer when adherence between the membrane and the substrate at the valve seat is stronger, and the opening time is shorter if the vacuum applied to the air chamber is higher. The opening time can be shortened with additional pressure applied in the fluidic channel. Another important parameter is the closing time. Shorter closing times are generally better. The closing time is shorter if the pressure applied to the air chamber is higher.

Figure 11:
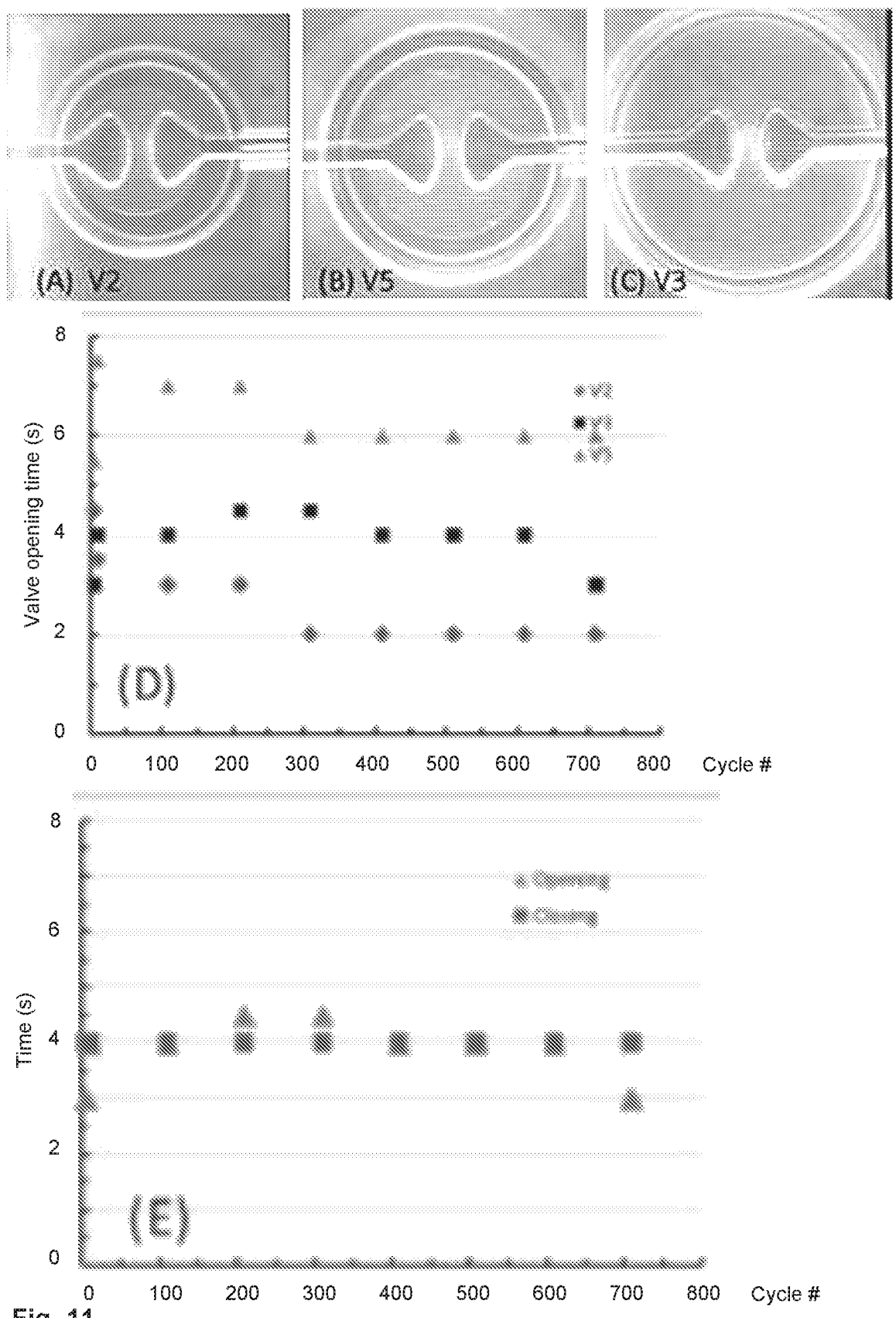
FIG. 11 depicts optical microscopic images of valves with valve seat diameters of 0.6 mm (A) V1, 0.8 mm (B) V5 and 1.2 mm (C) V3, together with a graph (D) showing dynamic valve opening time as function of the number of the open/close cycles for all three valves and a graph (E) showing both opening time and closing time as a function of the number of cycles for the valve V3.

To test opening and closing times, normally closed valves V2, V5 and V3 were fabricated as imaged in FIG. 11, where V2 is shown in (A), V5 is shown in (B) and V3 is shown in (C). The valves (V2, V5, V3) were fabricated with 200 µm thick TPE membranes and Zeonor™ substrates having microstructured valve seats formed in the substrates. The valve seats in V2, V5 and V3 had diameters of 0.6 mm, 0.8 mm and 1.2 mm, respectively. In each valve, width of the microfluidic channel was 100 µm, valve gap was 100 µm and the microstructures were micropillars having a height of 5 µm, a diameter of 10 µm and a pitch of 20 µm. The adhesion surfaces of the valve seats in V2, V5 and V3 had 706 micropillars, 1256 micropillars and 2827 micropillars, respectively.

Graph (D) in FIG. 11 shows dynamic valve opening time as function of the number of open/close cycles, where an opening vacuum of −5 psi (−34 kPa) was applied for 30 s followed by a closing pressure of 23 psi (159 kPa), also held for 30 s. The experiments were performed under primed, wet conditions using water injected through the valve seat through the microfluidic channel. The opening time decreases with increasing operational cycles. There are variations in opening time from one valve to another due to the different valve sizes. Graph (D) also shows that the valves are reliable after 400 times of cyclic operation. Though not graphically shown, the closing time for V2 and V5 is less than 2 s. Graph (E) in FIG. 11 shows both opening time and closing time as a function of the number of cycles for V3, and it is noted that opening time is very consistent. While V3 requires about 4 s to close, this is likely due to the larger size of the valve V3, given that the membrane may contact a ceiling of the air chamber when V3 is open. Contact with the air chamber ceiling can be avoided by increasing height of the air chamber in the process.

The data in FIG. 11 also illustrates that the valve opening time is longer when the valve is operated under dry conditions, indicating that the fluid inside the valve seat between the micropillars serves as a lubricant, which can reduce interaction between the membrane and the substrate at the valve seat. Typically, a valve like V5, requires 2 min. to open initially at −34 kPa after assembly. However, as seen in graph (D), the valve V5 after being primed (lubricated by fluid such as air or water and having a diameter of 0.8 mm in diameter, a valve gap of 100 µm, a fluidic channel 100 µm wide and number of micropillars (10 µm in diameter and 5 µm in height) of from 50 to 1256) only requires less than 8 s to open under the dynamic testing condition.

After finishing the last cyclic operation, the air control chamber of the valve was left to vent to atmosphere. After 14 hours of venting, re-initialization opening time was 40 seconds and 68 seconds, respectively, for valves V2 and V5. After 24 hours, re-initialization opening time was 50 seconds and 90 seconds, respectively, for valves V2 and V5. Increased opening time on re-initialization is due to increased interaction between the membrane and the substrate at the valve seat. If a shorter re-initialization opening time is desired, it is a particular advantage of the present normally closed valves that the re-initialization opening time can be reduced by fabricating valves with fewer micropillars on the valve seat. In this manner, the valves are finely tunable to desired performance characteristics.

Figure 12:
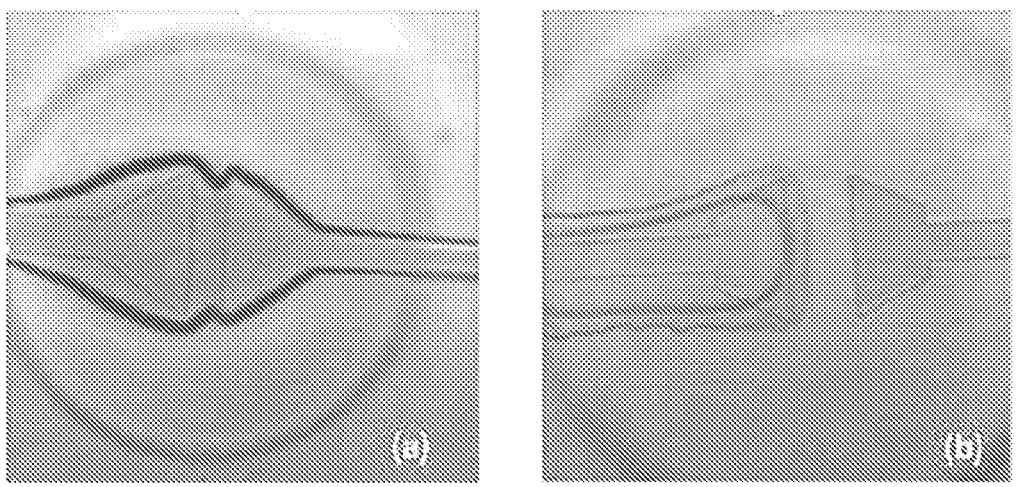
FIG. 12 is an optical photograph of a valve with a diameter of 0.8 mm, a valve gap length of 100 µm, a fluidic channel 100 µm wide, a valve with a diameter of 1.2 mm, a valve gap length of 200 µm, and a fluidic channel in width of 100 µm (b).

For a valve without microstructures on the valve seat (but otherwise the same), it is not possible to open the valve by applying negative pressure of 34 kPa after assembly. Such a non-microstructured valve could be forced open by applying 103 kPa on the fluidic channel in addition to applying a negative pressure of 34 kPa on the membrane (in the air chamber above the membrane). Under this condition, it usually takes 5 to 10 minutes to open the membrane from the valve seat as shown in FIG. 12 (a). Once the valve is open, fluids can pass through the valve, and portions of the membrane remain adhered to the surface of the valve seat. The adhered portions of the valve gap area cannot be opened unless the downstream portion of the fluidic channel is closed to allow pressure to build up inside the valve to force the membrane lift up from the valve seat. However, there is a risk of delamination of the upstream portion of the fluidic channel. FIG. 12 (b) shows an example of a valve with a diameter of 1.2 mm, a gap length of 200 µm and a fluidic channel width of 100 µm. The fluidic channel starts to delaminate on the upstream side after applying 103 kPa on the fluidic channel with an additional negative 34 kPa applied in the air chamber for 5 minutes without succeeding in opening the valve at the valve gap.

As an illustration of the ability to tune re-initialization opening time (as well as initial opening time), another set of valves was fabricated with the same valve size as valve V5 above, where valve seat diameter is 0.8 mm, membrane thickness in 200 µm, microfluidic channel width is 100 µm and valve gap is 100 µm. The micropillars on the valve seats were 10 µm in diameter and 5 µm in height, but the number of micropillars on the valve seats was varied to provide valves with 310 micropillars (V3 and V4), 139 (V5 and V6) micropillars and 50 micropillars (V2). Initial opening times for these valves having reduced micropillar density on the valve seat was less than 2 s, which is more than 50 times less than that of a similar valve with 1256 micropillars, representing a further reduction in initial opening time over the valves described above.

Figure 13:
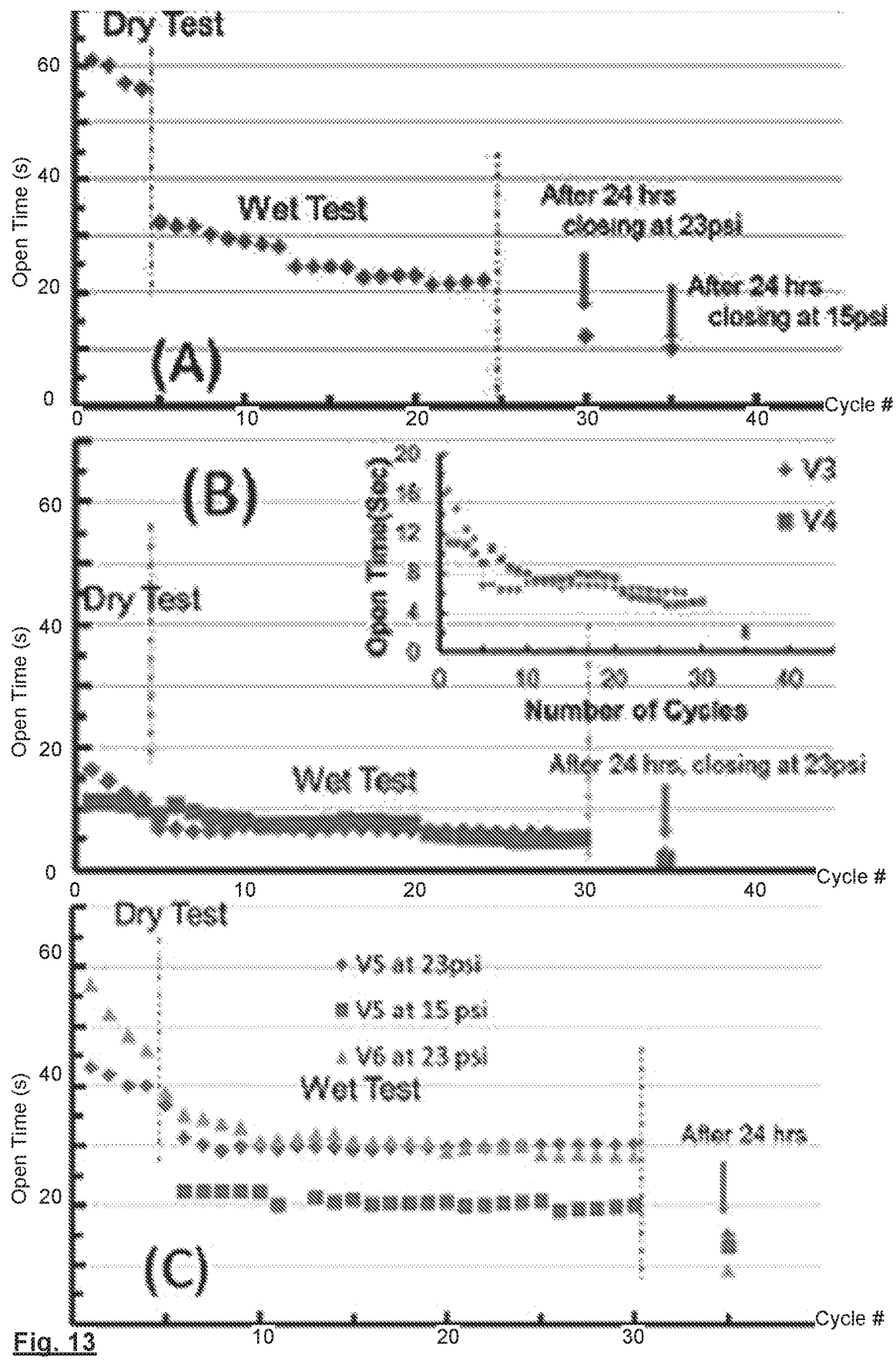
FIG. 13 depicts graphs of dynamic opening time vs. number of cycles for valves with different densities of micropillars.

With reference to FIG. 13, the dynamic opening times for the valves V2-V6 were also studied. Graph (A) in FIG. 13 shows the dynamic opening time for V2 with 50 micropillars on the adhesion controlled surface. Using an open/close cycle of: 60 s open at vacuum of −12 psi (−83 kPa))/30 s closed at 23 psi (159 kPa) under dry conditions (trapped air serves as lubricant), the dynamic opening time was more than 50 s. The dynamic opening time decreased dramatically from 50 to −30 s under wet conditions (water is introduced into the valve), and continued to decrease with increasing valve cycling. After 25 open/close cycles, the valve was left in a rest state (the air control chamber was vented following the last valve open cycle). After 24 hours, the dynamic opening time decreased to 13 s when operated cyclically with 23 psi (159 kPa) closing pressure, and decreased to 9 seconds when operated at 15 psi (103 kPa), indicating that the dynamic opening time depends also on the pressure applied to the valve during a pressed closed state. Generally, the opening times are shorter for lower applied closing pressures due to reduced forced adhesion. Of particular note, the re-initialization opening time after the rest period was less than 2 s, illustrating that normally closed valves with lower micropillar density on the valve seat leads to reduced re-initialization opening time.

Graph (B) in FIG. 13 shows the dynamic opening time for V3 and V4 with 310 micropillars per valve. Using an open/close cycle of 30 s open at vacuum of −12 psi (−83 kPa))/30 s closed at pressure of 23 psi (159 kPa). Under dry conditions (trapped air serves as lubricant), the dynamic opening time was about 10 to 14 seconds. The dynamic opening time decreased to 4 to 6 seconds under the wet condition (with water trapped in the valve seat). After a 24-hour rest period, the dynamic opening time further decreased to 2 seconds. The re-initialization opening time was also less than 2 seconds.

Graph (C) in FIG. 13 shows the dynamic opening time for V5 and V6 with 139 micropillars per valve. Dynamic opening time was about 45 to 55 s under dry testing conditions. The opening time deceased to about 30 s when the valve was primed and wet (water trapped in the valve seat). The dynamic opening time further decreased when the valve was operated at 15 psi (103 kPa) instead of 23 psi (159 kPa). After 24 hours rest, the vented valve dynamic opening time further decreased to 15 seconds for V5 and 9 seconds for V6. For both V5 and V6, the re-initialization opening time was less than 2 seconds. The decrease in dynamic opening time with increasing number of cycling operations and waiting time indicates that the adhesion between the membrane and the valve seat becomes weaker when the surface energies of the membrane and the valve seat are modified with water molecules. Absorption of water molecules on the surface of the membrane at the valve seat mimics an artificial surface treatment that can be done at the valve seat locally.

The experiments illustrated by FIG. 11 and FIG. 13 show that the permanent bonding issue at the valve seat between the membrane and substrate can be successfully solved and furthermore tuned, by introducing structured adhesion-control surface. The adhesion force between the membrane and substrate at the valve seat decreases with decreasing surface contact area at the valve seat, and its vicinity, therefore initial opening time is shorter after valve fabrication. The minimum number of micropillars required in a device is a function of size of the valve seat, thickness of the membrane, material properties of the membrane (e.g. stiffness of the membrane, Young's modulus of the materials) and height of the micropillars. A minimum number of micro-pillars (or similar structures) are required to balance the amount of contact at the valve seat, while preventing membrane collapse. If the number, size and spacing of micropillars allows the membrane to conform, the dynamic opening time increases for a given applied pressure, due to the enhancement of the adhesion between the membrane and the valve seat (valve seat floor), and the absence of a tenting of the membrane that ensures presence of fluid filled voids. The dynamic opening time can be dramatically reduced when the surface of the valve is primed and wetted with a fluid lubricant that would resist the conformation, even if surface tension of the membrane would not provide tenting.

Adjusting a shape and arrangement of the micropillars can further reduce the initial opening time while keeping dynamic opening time reasonably low. Rounded micropillar tops are particularly useful in this regard. The dynamic opening time can also be reduced by operating the valve in a pressed closed state at lower pressures for a given set of design parameters (membrane thickness, valve seat area, valve seat gap and microfluidic channel cross-section and length).

Applications of Normally Closed Valves

Figure 14:
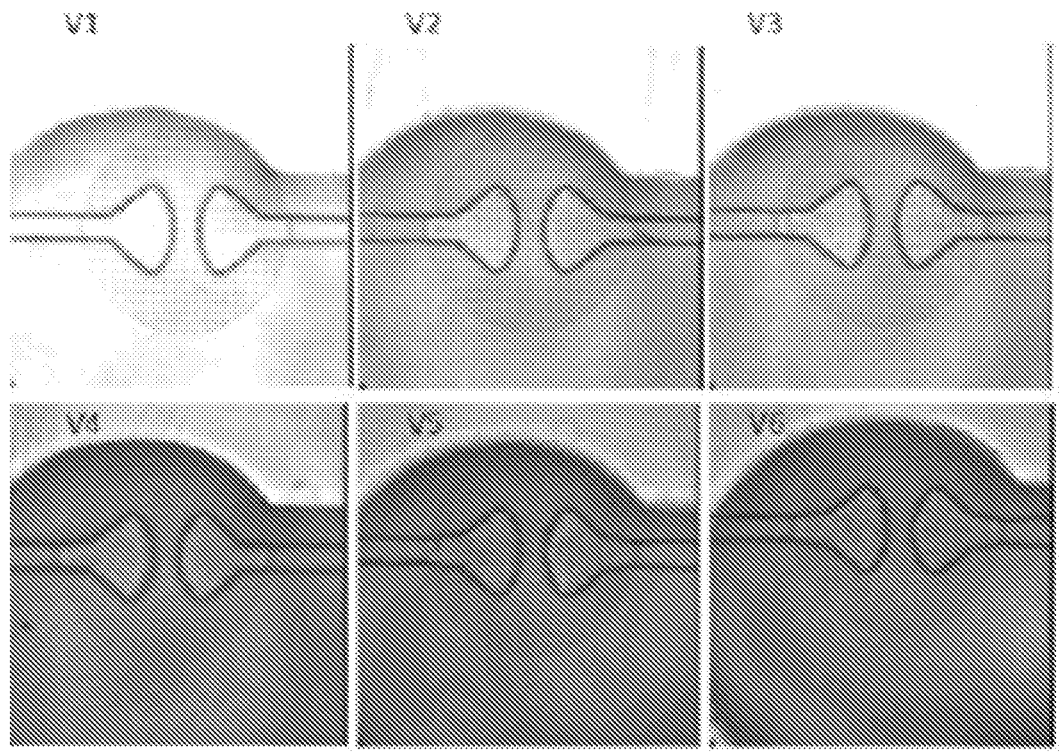
FIG. 14 is a panel with optical photographs of 6 valves with same valve size (0.8 mm in diameter), fluidic channel width (100 µm), valve gap length (100 µm), pillar density (310 micropillars), pillar diameter (10 µm), pillar height (5 µm), and membrane thickness (200 µm). A pneumatic air channel and air chamber are CNC machined on COC (Zeonor™) substrate.

Polymeric normally closed valves may be utilized in microfluidic cover lids for cell analysis devices. In such an application, valve consistency is very important because valves may be required to open and close simultaneously. Operational problems may arise if one valve behaves significantly differently from the others. A series of six valves were fabricated having the same design (valve size, valve gap length, fluidic channel width) and having the same density of micropillars (310 micropillars on valve seat with 10 μm in diameter and 5 μm in height) on a same chip to minimize variations from one sample to another in the fabrication process. Nevertheless, as shown in FIG. 14, some variations from one valve to another still occur because of uniformity issues in mold fabrication. Uniformity issue routinely arise in replication of microfluidic devices from molds by hot-embossing. Uniformity issues can manifest as misalignment between the microfluidic layer and the pneumatic air channel layer, as well as in thickness variation of the membrane. In this specific case, the pneumatic air channel was CNC machined.

Figure 15:
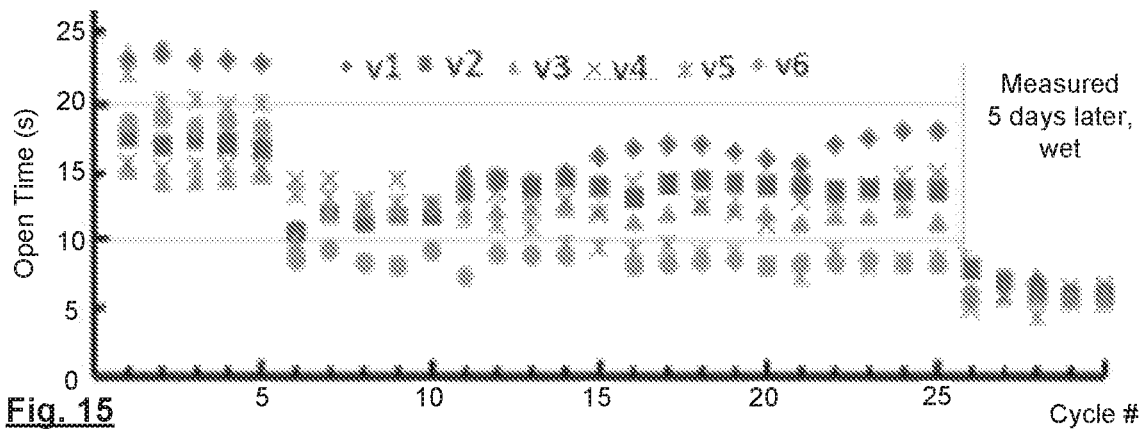
FIG. 15 is a graph of dynamic opening time vs. number of cycles for the valves of FIG. 14.

Testing results show that the static (initial and re-initial) opening time is less than 2 seconds for all six valves, while the dynamic opening times depicted in FIG. 15 slightly vary from one valve to another, which might be attributed to smaller variations of the valves. The first 5 cycles depicted in FIG. 15 were tested under the dry condition (the voids between the membrane and the surface of the valve seat are filled with air). The dynamic opening time goes down when the valves are wet where the voids between the membrane and the valve seat are filled with water. The opening time goes down again after the valves are exposed to the wet condition (water) for 5 days. The dynamic opening time for all these six valves are in between 5 to 8 seconds. The opening time of this set of valves are slightly longer than that of V3 and V4 presented in FIG. 13 although the density of the micropillars is the same. The slightly different behavior of these two types of valves may be attributable to processing variations of the two batches. For example, there may be variations in pillar size and height, in the misalignment between the valve seat and the pneumatic air chamber, as well as variances in the design of the pneumatic air channel and air chamber. The pneumatic air control part was fabricated using CNC machining with larger air channel and air chambers, while the pneumatic air control part was made by hot-embossing in the valves presented in FIG. 13.

Being able to tune the adhesion of the membrane layer to the flow layer at the valve seat of a normally closed valve readily permits fabrication of microfluidic devices utilizing a plurality of valves that are openable under different pressure conditions to obtain different functionalities.

Figure 16:
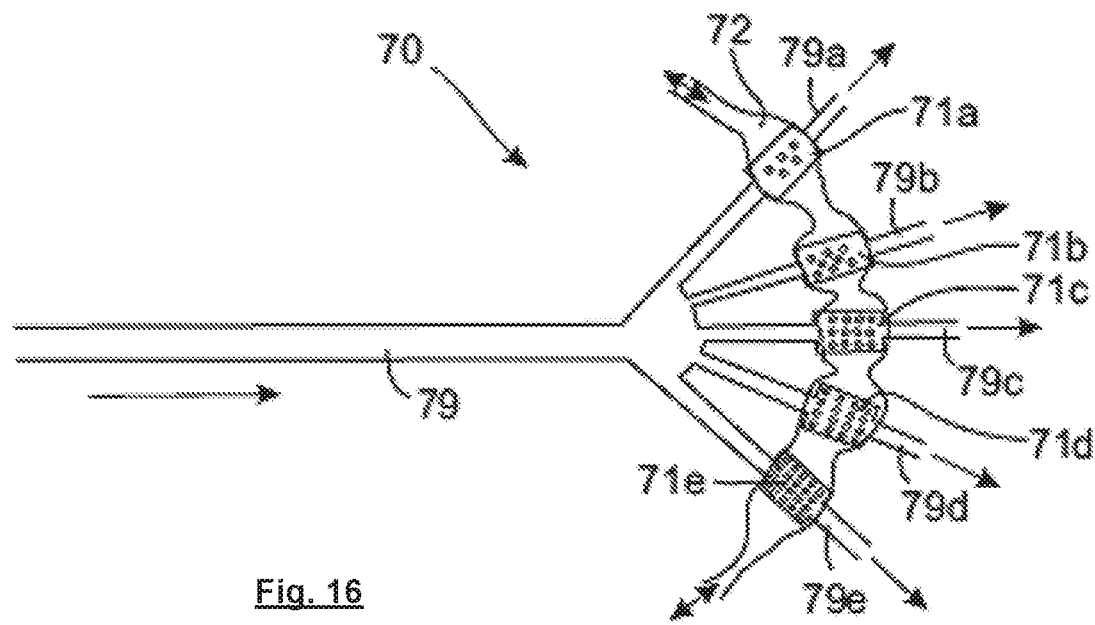
FIG. 16 is a schematic drawing of a microfluidic device comprising a plurality of normally closed valves with graded adhesion control surfaces for successive valve opening.

FIG. 16 depicts an example of a microfluidic device 70 having a main microfluidic channel 79 providing fluid flow to five microfluidic channel branches 79a, 79b, 79c, 79d, 79e. Fluid flow through each channel branch 79a, 79b, 79c, 79d, 79e is controlled by five normally closed valves 71a, 71b, 71c, 71d, 71e, one in each of the channel branches 79a, 79b, 79c, 79d, 79e, respectively. The valves 71a, 71b, 71c, 71d, 71e comprise micro-featured adhesion controlled surfaces having micropillars of the same size but having different micropillar densities; the micropillar density becoming successively higher from valve 71a to 71e. A universal pneumatic control layer 72 controls air pressure to the air chambers of each valve. As air pressure is reduced in the pneumatic control layer 72, valve 71a will open first because the micro-featured valve seat with the lowest density of micropillars provides the least adhesion between the membrane layer and flow layer at the valve seat. Valves 71b, 71c, 71d, 71e successively open as the air pressure in the pneumatic control layer 72 is reduced further. In this manner, staged valving is provided with each valve opening at successive pressure steps, allows fluid to flow successively into different channels. While a single pneumatic control layer is shown, individual pneumatic control for each valve may be used instead.

Figure 17:
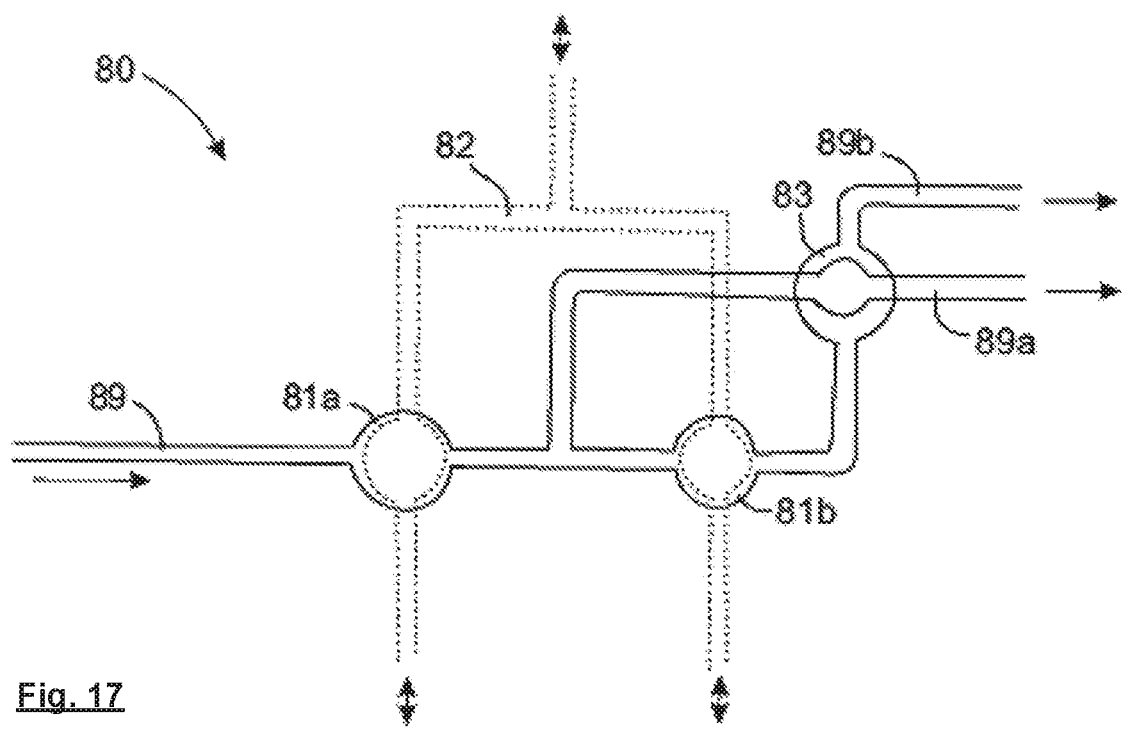
FIG. 17 depicts a schematic drawing of a microfluidic device comprising normally closed valves configured to act as a fluid control switch.

FIG. 17 depicts an example of a microfluidic device 80 having a staged valve configuration, which acts as a fluid control switch. A first normally closed valve 81a having a micro-featured valve seat opens at a first negative pressure applied in a single pneumatic control layer 82, thereby delivering fluid from a main microfluidic channel 89 to a first microfluidic channel branch 89*a*. A second normally closed valve 81*b* having a structured adhesion control surface opens at a second negative pressure, more negative than the first negative pressure, applied in the single pneumatic control layer 82, thereby delivering fluid from a main microfluidic channel 89 to a second microfluidic channel branch 89*b*. Fluid flowing in the second microfluidic channel branch 89*b* closes a fluid valve 83 in the first microfluidic channel branch 89*a* thereby switching off fluid flowing through the first microfluidic channel branch 89*a*. In this manner, a fluid flow switch is created using two normally closed valves having structured adhesion control surfaces tuned to permit opening of the valves at different pressures. While a single pneumatic control layer is shown, individual pneumatic control for each valve may be used instead.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A polymeric microfluidic valve comprising:
   a plastic substrate;
   a resilient deformable elastomeric membrane extending across the substrate, the substrate and membrane defining a valve region separating at least two microfluidic channels in a microfluidic device;
   a valve seat in the valve region on one of the membrane and the substrate, the valve seat having an adhesion-controlled surface where the membrane and the substrate contact when the valve is closed; and
   a control fluid chamber separated and sealed from the microfluidic channels by the membrane,
   where:
   the adhesion-controlled surface is provided with a relief pattern of microstructures that provide a plurality of separated top meeting surfaces and recessed surfaces, the top meeting surfaces collectively having a cumulative surface area less than 90% of an area spanned by the adhesion-controlled surface, and having fluid-filled voids between the top meeting surfaces when the valve is closed, the relief pattern being an open pattern in that the fluid-filled voids are inter-connected across the valve seat between opposite ends of the valve seat in the microchannel;
   the relief pattern is provided either on the valve seat or the membrane or substrate facing the valve seat; and
   the fluid-filled voids reduce adhesion between the membrane and the substrate in the spanned area compared to 1-adhesion if no microstructures were present in the spanned area and compared to 2-adhesion if the membrane and the substrate were in conformal contact over all available surfaces including the top meeting surfaces and the recessed surfaces.

2. The valve according to claim 1 wherein the cumulative surface area of the top meeting surfaces on the adhesion-controlled surface, when the valve is closed, is between 0.55% and 76% of a surface area spanned by the adhesion-controlled surface.

3. The valve according to claim 1, wherein the cumulative surface area of the top meeting surfaces on the adhesion-controlled surface is between 0.54% and 30% of a total surface area of the adhesion-controlled surface, the total surface area including the cumulative surface area of the top meeting surfaces, a cumulative surface area of the recessed surfaces, and a cumulative surface area of side walls of the microstructures connecting the top meeting and recessed surfaces.

4. The valve according to claim 1, wherein the top meeting and recessed surfaces of the microstructures are separated by a depth d of at least 75 nm, and a mean spacing between adjacent top meeting surfaces is no more than 20 d, and no less than ½ d.

5. The valve according to claim 1, wherein the plurality of distinct top meeting surfaces comprises at least 25 distinct top meeting surfaces, that are not connected by any path restricted to the top meeting surfaces.

6. The valve according to claim 1, wherein the substrate has a stiffness at least one order of magnitude larger than a stiffness of the membrane; the membrane has a thickness in a range of about 20-1000 pm, and a Young's modulus in a range of about 0.1 to 100 MPa as measured by ASTM D638; or the membrane is a saturated or unsaturated thermoset rubber, or a thermoplastic elastomer.

7. The valve according to claim 1, wherein the microstructures comprise micropillars formed: in a regular array on the adhesion control surface; generally conically or frustoconically with a cone angle from about 20° to about 130° ; or to have a nominal diameter of 1 pm to 200 pm.

8. The valve according to claim 7, wherein the micropillars have rounded tops; tops of the microstructures are decorated with nanostructures; or the tops are surface treated to further reduce adhesion between the membrane and the substrate.

9. The valve according to claim 1, wherein the fluid-filled voids have a collective void volume and the microstructures and/or nanostructures have a collective structured volume, wherein the collective void volume is between 50 to 99.5% of a sum of the collective void volume and the collective structure volume when the valve is closed with no pressure differential between the control fluid chamber and the microfluidic channel.

10. The valve according to claim 1 wherein the adhesion-controlled surface is on a valve body separating the channels.

11. The valve according to claim 10 wherein the valve body has a height that extends a full depth of the channels and provides walls that terminate each of the channels, and the valve is a normally closed valve.

12. The valve according to claim 10 wherein the valve body has a height that extends a fraction of a depth of the channels, and the valve is a normally open valve.

13. The valve according to claim 10 wherein the adhesion-controlled surface extends beyond the valve body and covers a top meeting surface of substrate intermediate the channels.

14. The valve according to claim 1 wherein the fluid filled voids are filled with air or water.

15. A method of controlling fluid flow in a microfluidic channel using a polymeric microfluidic valve, the method comprising:
   providing a polymeric normally closed microfluidic valve as defined in claim 1 in a microfluidic device; and,
   changing a pressure in the control fluid chamber to provide sufficient force on the membrane to overcome adhesion with the substrate at the adhesion-controlled surface of the valve seat, to separate the membrane from the substrate thereby opening the valve to permit fluid to flow between the two or more microchannels.

16. The method according to claim 15:
   further comprising subsequently sufficiently changing a pressure in the control fluid chamber when the valve is open to press the substrate and the membrane together at the adhesion-controlled surface thereby sealingly engaging the membrane against the substrate to close the valve to prevent fluid from flowing through the microfluidic channel; or wherein the change in pressure in the control fluid chamber is 34 kPa or less, and an initial opening time is 1 minute or less.

17. A normally closed polymeric microfluidic valve comprising:
a plastic substrate;
a resilient deformable elastomeric membrane extending across the substrate, the substrate and membrane defining a valve region separating at least two microfluidic channels in a microfluidic device;
a valve seat in the valve region on one of the membrane and the substrate, the valve seat having an adhesion-controlled surface where the membrane and the substrate contact when the valve is closed; and
a control fluid chamber separated and sealed from the microfluidic channels by the membrane,
where:
the adhesion-controlled surface is provided with a relief pattern of microstructures that provide a plurality of separated top meeting surfaces and recessed surfaces, the top meeting surfaces collectively having a cumulative surface area less than 90% of an area spanned by the adhesion-controlled surface, and having fluid-filled voids between the top meeting surfaces when the valve is closed;
the relief pattern is on the valve seat, or a meeting surface of the valve seat; and
the fluid-filled voids reduce adhesion between the membrane and the substrate in the spanned area, said adhesion reduction sufficient to permit initial opening times that are at least twice as fast as with a valve having no relief pattern of microstructures.

18. The normally closed valve according to claim 17, further characterized by at least one of the following listed items:
the cumulative surface area of the top meeting surfaces on the adhesion-controlled surface is between 0.54% and 30% of a total surface area of the adhesion-controlled surface, the total surface area including the cumulative surface area of the top meeting surfaces, a cumulative surface area of the recessed surfaces, and a cumulative surface area of side walls of the microstructures connecting the top meeting and recessed surfaces;
the top meeting and recessed surfaces of the microstructures are separated by a depth d of at least 75 nm, and a mean spacing between adjacent top meeting surfaces is no more than 20 d, and no less than ½ d;
the plurality of distinct top meeting surfaces comprises at least 25 distinct top meeting surfaces, that are not connected by any path restricted to the top meeting surfaces;
the substrate has a stiffness at least one order of magnitude larger than a stiffness of the membrane;
the membrane has a thickness in a range of about 20-1000 pm, and a Young's modulus in a range of about 0.1 to 100 M Pa as measured by ASTM D638;
the membrane is a saturated or unsaturated thermoset rubber, or a thermoplastic elastomer;
the microstructures comprise micropillars formed in a regular array on the adhesion control surface;
the microstructures comprise generally conical or frusto-conical micropillars with a cone angle from about 20° to about 130°;
the microstructures comprise micropillars having a nominal diameter of 1 pm to 200 pm;
the microstructures comprise micropillars having rounded tops;
the tops of the microstructures are decorated with nanostructures;
the tops of the microstructures are surface treated to further reduce adhesion between the membrane and the substrate;
the fluid-filled voids have a collective void volume and the microstructures and/or nanostructures have a collective structured volume, wherein the collective void volume is between 50 to 99.5% of a sum of the collective void volume and the collective structure volume when the valve is closed with no pressure differential between the control fluid chamber and the microfluidic channel;
the adhesion-controlled surface is on a valve body separating the channels;
the valve body has a height that extends a full depth of the channels and provides walls that terminate each of the channels, and the valve is a normally closed valve;
the valve body has a height that extends a fraction of a depth of the channels, and the valve is a normally open valve;
the adhesion-controlled surface extends beyond the valve body and covers a top meeting surface of substrate intermediate the channels.

19. The normally closed valve according to claim 17 further characterized by at least 2 of the items listed in claim 18.

20. A normally closed polymeric microfluidic valve comprising:
a plastic substrate;
a resilient deformable elastomeric membrane extending across the substrate, the substrate and membrane defining a valve region separating at least two microfluidic channels in a microfluidic device;
a valve seat in the valve region on one of the membrane and the substrate, the valve seat having an adhesion-controlled surface where the membrane and the substrate contact when the valve is closed; and
a control fluid chamber separated and sealed from the microfluidic channels by the membrane,
where:
the adhesion-controlled surface is provided with a relief pattern of microstructures that provide a plurality of separated top meeting surfaces and recessed surfaces, the top meeting surfaces collectively having a cumulative surface area less than 90% of an area spanned by the adhesion-controlled surface, and having fluid-filled voids between the top meeting surfaces when the valve is closed;
the relief pattern is on the valve seat, or a meeting surface of the valve seat; and
the fluid-filled voids reduce adhesion between the membrane and the substrate in the spanned area compared to 1-adhesion if no microstructures were present in the spanned area and compared to 2-adhesion if the membrane and the substrate were in conformal contact over all available surfaces including the top meeting surfaces and the recessed surfaces;
further characterized by at least one of the following listed items:
the cumulative surface area of the top meeting surfaces on the adhesion-controlled surface is between 0.54% and 30% of a total surface area of the adhesion-controlled surface, the total surface area including the cumulative surface area of the top meeting surfaces, a cumulative surface area of the recessed surfaces, and a cumulative surface area of side walls of the microstructures connecting the top meeting and recessed surfaces;

the top meeting and recessed surfaces of the microstructures are separated by a depth d of at least 75 nm, and a mean spacing between adjacent top meeting surfaces is no more than 20 d, and no less than ½ d;

the plurality of distinct top meeting surfaces comprises at least 25 distinct top meeting surfaces, that are not connected by any path restricted to the top meeting surfaces;

the substrate has a stiffness at least one order of magnitude larger than a stiffness of the membrane;

the membrane has a thickness in a range of about 20-1000 pm, and a Young's modulus in a range of about 0.1 to 100 M Pa as measured by ASTM D638;

the membrane is a saturated or unsaturated thermoset rubber, or a thermoplastic elastomer;

the microstructures comprise micropillars formed in a regular array on the adhesion control surface;

the microstructures comprise generally conical or frustoconical micropillars with a cone angle from about 20° to about 130°;

the microstructures comprise micropillars having a nominal diameter of 1 pm to 200 pm;

the microstructures comprise micropillars having rounded tops;

the tops of the microstructures are decorated with nanostructures;

the tops of the microstructures are surface treated to further reduce adhesion between the membrane and the substrate;

the fluid-filled voids have a collective void volume and the microstructures and/or nanostructures have a collective structured volume, wherein the collective void volume is between 50 to 99.5% of a sum of the collective void volume and the collective structure volume when the valve is closed with no pressure differential between the control fluid chamber and the microfluidic channel;

the adhesion-controlled surface is on a valve body separating the channels;

the valve body has a height that extends a full depth of the channels and provides walls that terminate each of the channels, and the valve is a normally closed valve;

the valve body has a height that extends a fraction of a depth of the channels, and the valve is a normally open valve;

the adhesion-controlled surface extends beyond the valve body and covers a top meeting surface of substrate intermediate the channels.

\* \* \* \* \*